US 011565629B2

(12) United States Patent
Fukui et al.

(10) Patent No.: US 11,565,629 B2
(45) Date of Patent: Jan. 31, 2023

(54) DOUBLE-DOORED LID APPARATUS

(71) Applicant: TOYODA GOSEI CO., LTD., Kiyosu (JP)

(72) Inventors: Naoyuki Fukui, Kiyosu (JP); Etsuo Ozawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 861 days.

(21) Appl. No.: 16/515,217

(22) Filed: Jul. 18, 2019

(65) Prior Publication Data

US 2020/0071984 A1 Mar. 5, 2020

(30) Foreign Application Priority Data

Aug. 31, 2018 (JP) .............................. JP2018-163562
Sep. 12, 2018 (JP) .............................. JP2018-170853

(51) Int. Cl.
*B60R 7/04* (2006.01)
*E05B 83/32* (2014.01)
(Continued)

(52) U.S. Cl.
CPC ................ *B60R 7/04* (2013.01); *E05B 83/32* (2013.01); *E05C 7/04* (2013.01); *E05F 1/10* (2013.01);
(Continued)

(58) Field of Classification Search
CPC B60R 7/04; B60R 7/043; B60R 7/046; B60R 7/06; E05B 88/32; E05B 83/32; E05F 1/10; E05F 17/004
(Continued)

(56) References Cited

U.S. PATENT DOCUMENTS 10,040,397 B1 * 8/2018 Wuerthele .............. B60N 2/793
10,160,360 B2 * 12/2018 Keller ....................... B60R 7/04
(Continued)

FOREIGN PATENT DOCUMENTS

DE 102011118152 A1 * 5/2013 ........... B60N 2/4646
DE 102017130183 A1 * 8/2018 ............. B60N 2/753
(Continued)

OTHER PUBLICATIONS

English translation of WO 2006/051209; retrieved via Patent-Translate located atwww.epo.org. (Year: 2022).*
(Continued)

*Primary Examiner* — Jason S Daniels
(74) *Attorney, Agent, or Firm* — Posz Law Group, PLC

(57) ABSTRACT

A double-doored lid apparatus includes: a box body; first and second doors; an opening/closing mechanism that opens and closes the first and second doors in conjunction with each other; a locking mechanism that locks the first and second doors in their closed states; an urging member that urges the first and second doors in an opening direction while the doors are locked by the locking mechanism; and a support member that transmits the urging force from the urging member to the first and second doors. The support member includes: a first support portion that supports one end portion of the urging member; and second and third support portions that start to come into contact with the first and second doors, respectively, before the doors reach a predetermined locking position during closing motions thereof, and that support the first and second doors when the doors are locked by the locking mechanism.

14 Claims, 14 Drawing Sheets

(51) Int. Cl.
  *E05F 17/00* (2006.01)
  *E05F 1/10* (2006.01)
  *E05C 7/04* (2006.01)
(52) U.S. Cl.
  CPC ...... *E05F 17/004* (2013.01); *E05F 2017/008* (2013.01); *E05Y 2900/538* (2013.01)
(58) Field of Classification Search
  USPC .............................. 220/826; 296/24.34, 37.8
  See application file for complete search history.

(56) References Cited

U.S. PATENT DOCUMENTS

| | | | |
|---|---|---|---|
| 10,717,390 B2* | 7/2020 | Anderson | E05B 83/32 |
| 11,220,197 B2* | 1/2022 | Hodgson | B60N 2/793 |
| 2010/0154309 A1 | 6/2010 | Shibata et al. | |
| 2014/0265405 A1* | 9/2014 | Appelboum | B60R 7/04 |
| | | | 296/24.34 |
| 2016/0339847 A1* | 11/2016 | Kodama | B60R 7/04 |
| 2018/0222363 A1* | 8/2018 | Stiver | B60R 7/04 |
| 2018/0236909 A1* | 8/2018 | Choi | B60N 2/767 |
| 2018/0236917 A1* | 8/2018 | Kim | B60N 2/753 |

FOREIGN PATENT DOCUMENTS

| | | |
|---|---|---|
| JP | 2004-161019 A | 6/2004 |
| JP | 2005-178841 A | 7/2005 |
| JP | 2006-307911 A | 11/2006 |
| JP | 2010-149645 A | 7/2010 |
| WO | WO-2006051209 A2 * 5/2006 | ............... B60N 2/77 |

OTHER PUBLICATIONS

Notification of Reasons for Refusal dated Sep. 7, 2021, issued in corresponding JP Patent Application No. 2018-163562 (and English Machine Translation).

* cited by examiner

DOUBLE-DOORED LID APPARATUS

TECHNICAL FIELD

The present invention relates to a double-doored lid apparatus.

BACKGROUND ART

Conventionally, a double-doored lid apparatus having two doors that are opened together via hinges has been known (e.g., Japanese Laid-Open Patent Publication No. 2006-307911). The double-doored lid apparatus includes a box body, two doors, an opening/closing mechanism, and a locking mechanism. The two doors cover an upper opening of the box body so as to be openable and closable, and are opened together via hinges when a user performs an operation to open the doors when the doors are closed. The opening/closing mechanism causes the two doors to open and close in conjunction with each other. The opening/closing mechanism causes the two doors to open in conjunction with each other through a pressing operation or a pulling operation performed by a user on an opening operation part such as a button or a lever. Further, the opening/closing mechanism causes the two doors to close in conjunction with each other through a press-closing operation performed by the user on one of the two doors. The locking mechanism locks the two doors in their closed states when the two doors are closed up to a predetermined locking position.

The opening/closing mechanism includes: a hinge member that is mounted to each door and holds the door on the box body so as to be swingable; an arm member having one end connected to the hinge member of each door; a gear that is provided on the other end of the arm member and meshes with another arm member; and the like. The opening/closing mechanism further includes a spring member that urges the door in an opening direction when the opening operation part is operated. The locking mechanism includes a swing member that is mounted to the box body so as to be swingable and has a claw portion to be hooked in a hooking groove of the door. The swing member swings so that the hooking of the claw portion in the hooking groove of the door is canceled when the opening operation part is operated. When the hooking of the claw portion of the swing member in the hooking groove of the door is canceled, the door is urged in the opening direction by an urging force of the spring member.

Further, when the double-doored lid apparatus as disclosed in Japanese Laid-Open Patent Publication No. 2006-307911 is mounted in a vehicle, the lid apparatus is generally disposed to the side of an occupant. Since being disposed to the side of an occupant, the lids (i.e., the doors described above) of the double-doored lid apparatus of this type, at the closed position, may be used as an arm rest for the occupant.

In recent years, various types of double-doored lid apparatuses have been proposed and put to practical use. Thus, further improvement in functions of the double-doored lid apparatuses is desired.

The present invention has been made in view of such circumstances. An object of the present invention is to improve the functions of a double-doored lid apparatus.

The present invention is a double-doored lid apparatus including: a box body including a storage portion having an opening; a first door configured to cover a part of the opening on one side so as to be openable and closable; a second door configured to cover a part of the opening on the other side so as to be openable and closable; an opening/closing mechanism configured to open and close the first door and the second door in conjunction with each other; a locking mechanism configured to lock the first door and the second door in a closed state when the first door and the second door are closed up to a predetermined locking position; a support member movable relative to the box body in an up-down direction; and an urging member configured to generate an urging force that urges the first door and the second door in an opening direction via the support member when the first door and the second door are locked by the locking mechanism, the urging member having opposed end portions, one of the end portions being supported by the box body while the other end portion being supported by the support member. The support member includes: a first support portion that supports the other end portion of the urging member; a second support portion that starts to come into contact with the first door before the first door reaches the predetermined locking position during a closing motion of the first door, and supports the first door when the first door is locked by the locking mechanism; and a third support portion that starts to come into contact with the second door before the second door reaches the predetermined locking position during a closing motion of the second door, and supports the second door when the second door is locked by the locking mechanism.

Hereinafter, the double-doored lid apparatus according to this mode is sometimes referred to as a double-doored lid apparatus according to a first mode.

The present invention is a double-doored lid apparatus including: a box having an internal space with an opening facing upward; two lids each having a lid body and a pivotal shaft that is integrated with the lid body and is pivotally supported relative to the box, the two lids being configured to open and close the opening of the box; and a link element configured to link the two lids with each other, and synchronize the positions of the two lids. The two lids are positionally changed between a closed position at which the lid bodies are disposed above the box and close the opening, and an opened position at which the lid bodies are disposed at opposing two sides of the box and open the opening. Each of the lid bodies includes an elastically deformable cushion portion and a base body portion harder than the cushion portion. Each of the lid bodies has an opened-position upper-surface portion that becomes an upper surface at the opened position and a closed-position upper-surface portion that becomes an upper surface at the closed position, and the opened-position upper-surface portion and the closed-position upper-surface portion are formed of the cushion portion.

Hereinafter, the double-doored lid apparatus according to this mode is sometimes referred to as a double-doored lid apparatus or a box apparatus for vehicles according to a second mode.

The double-doored lid apparatus according to the present invention has improved functions.

Figure 9:
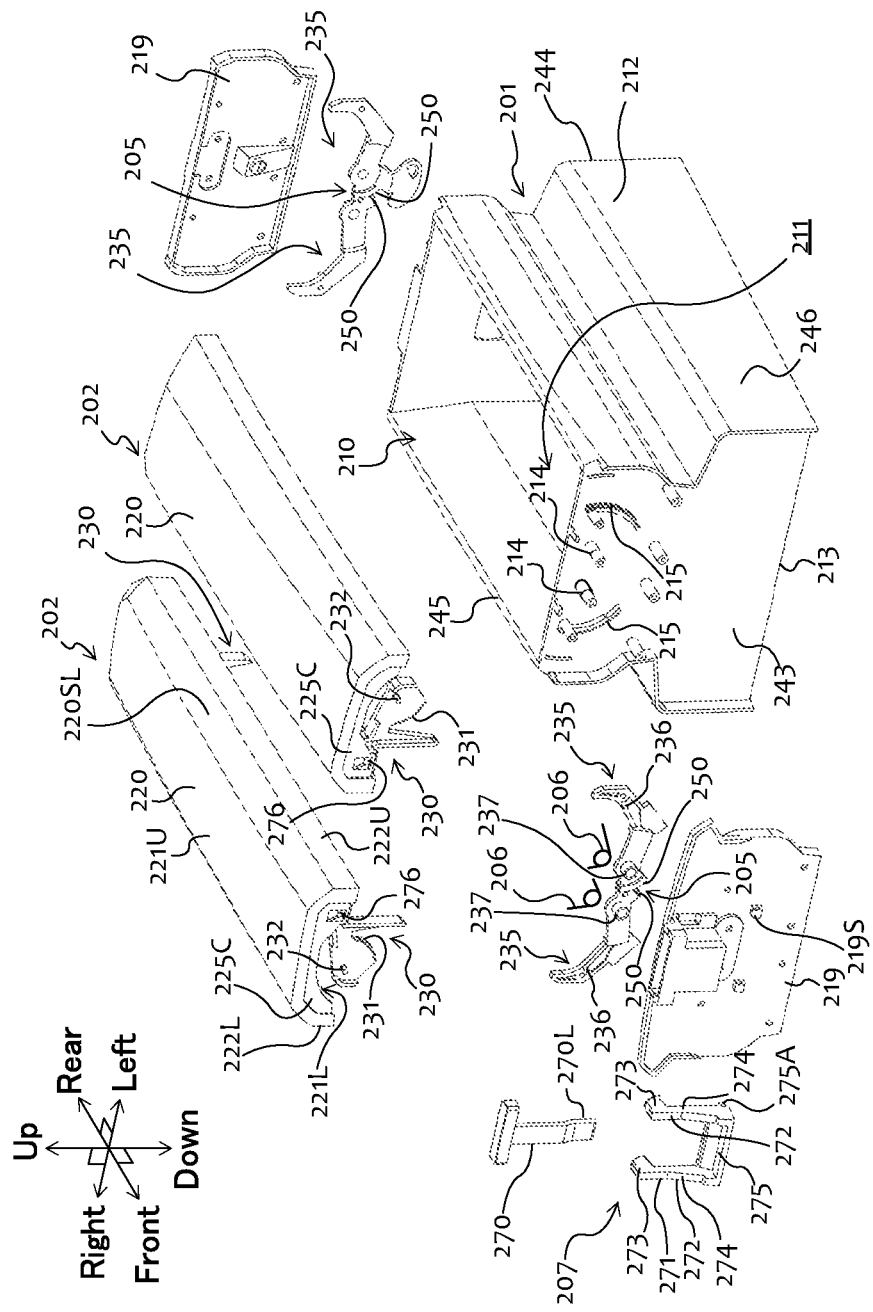
Figure 10:
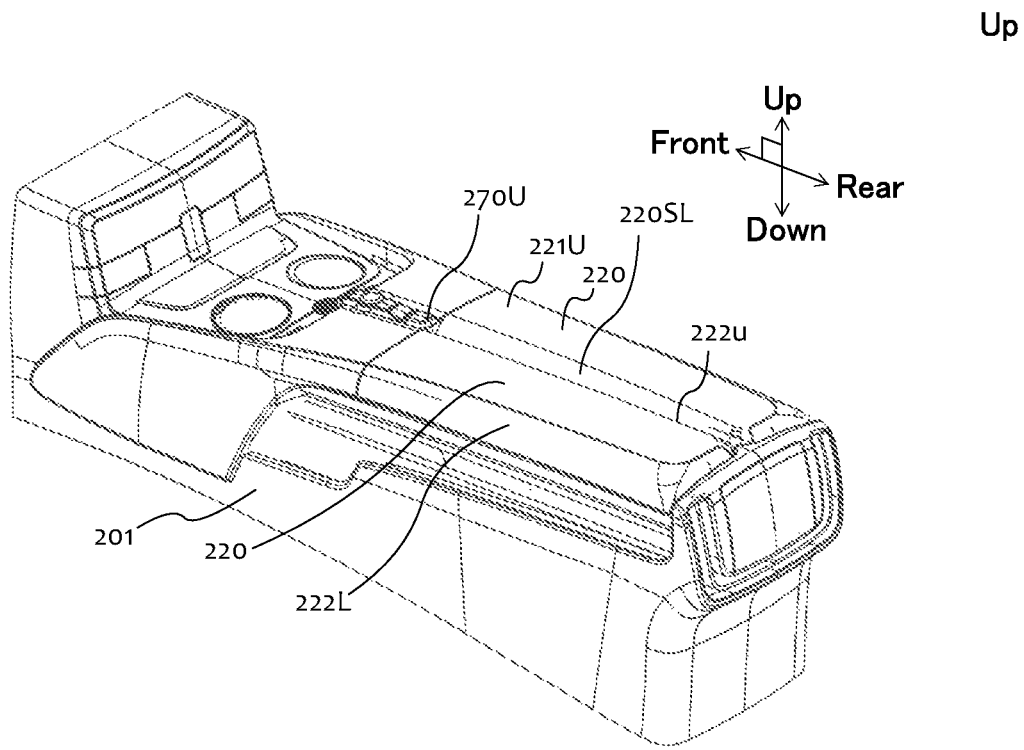
Figure 11:
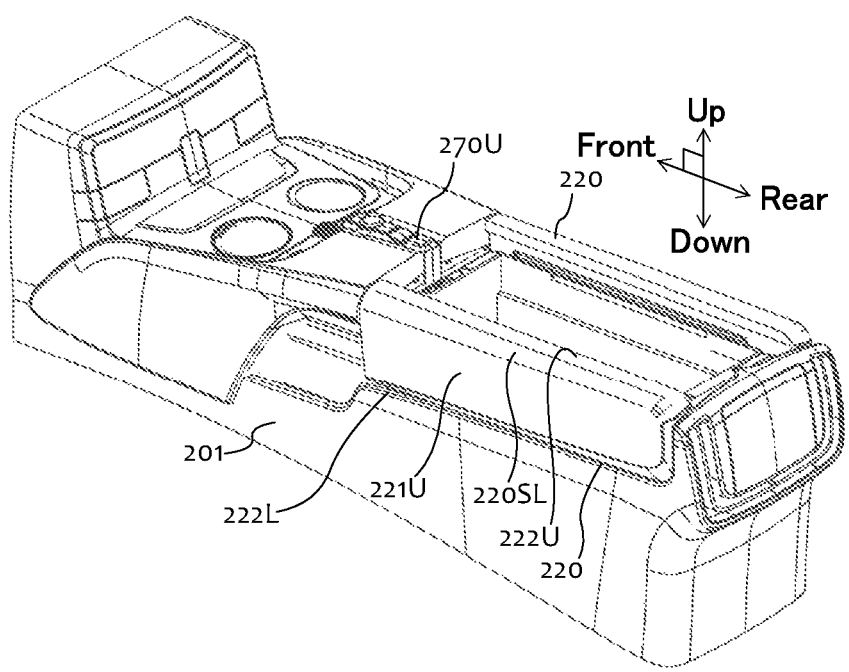
Figure 12:
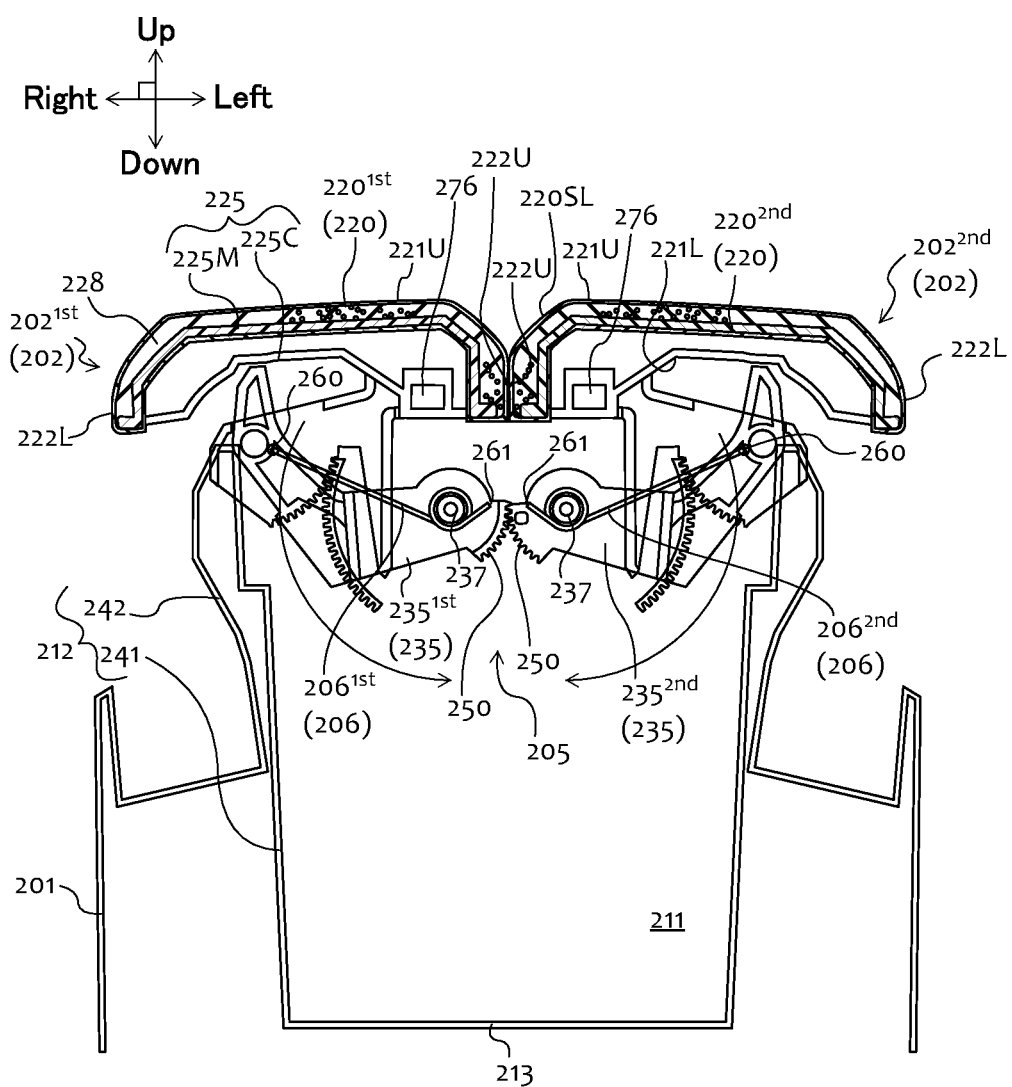
Figure 13:
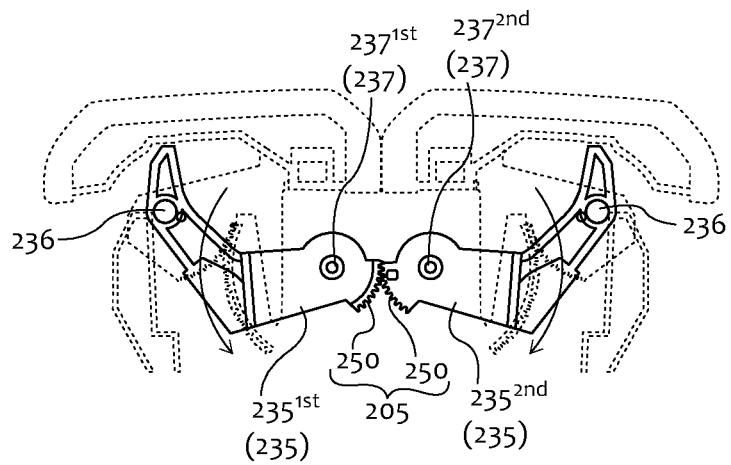
Figure 14:
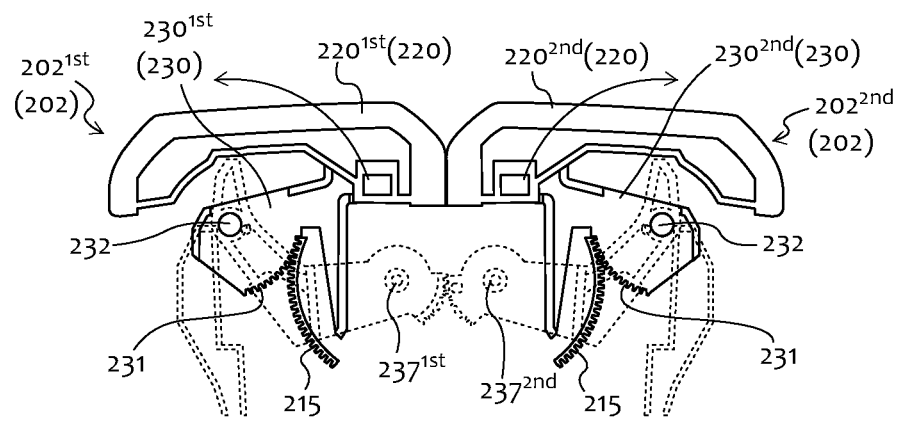
Figure 15:
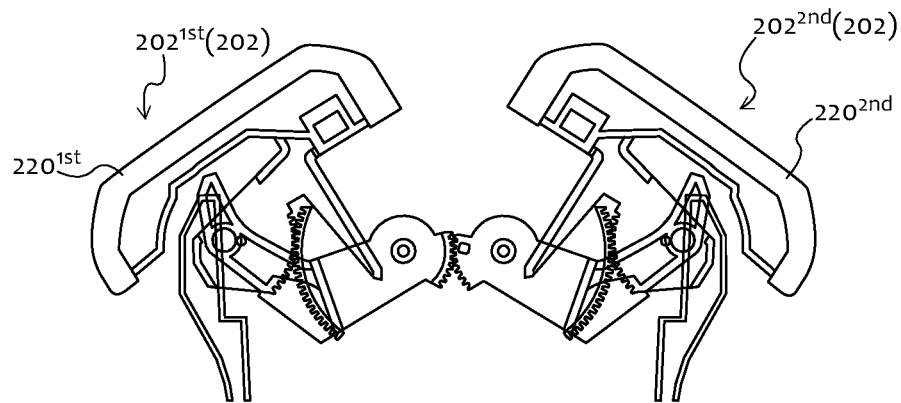
Figure 16:
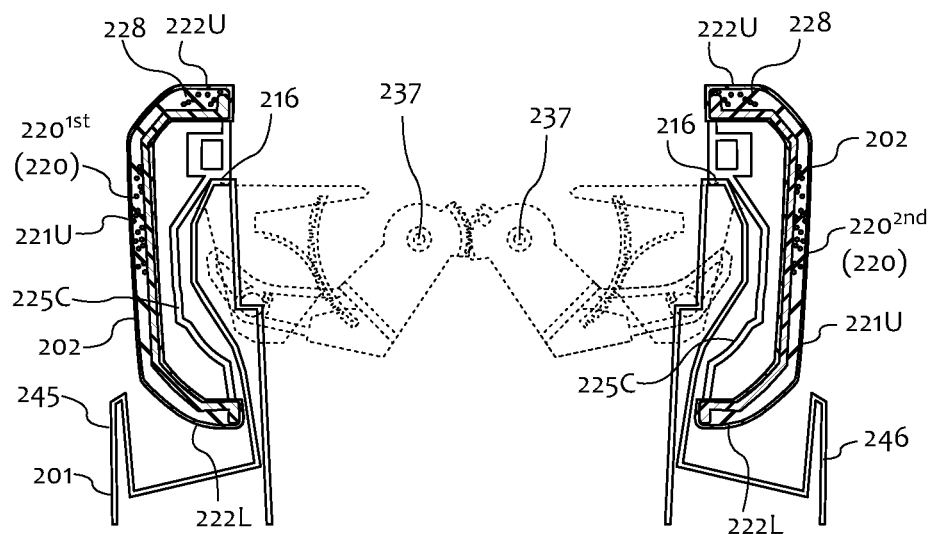
Figure 17:
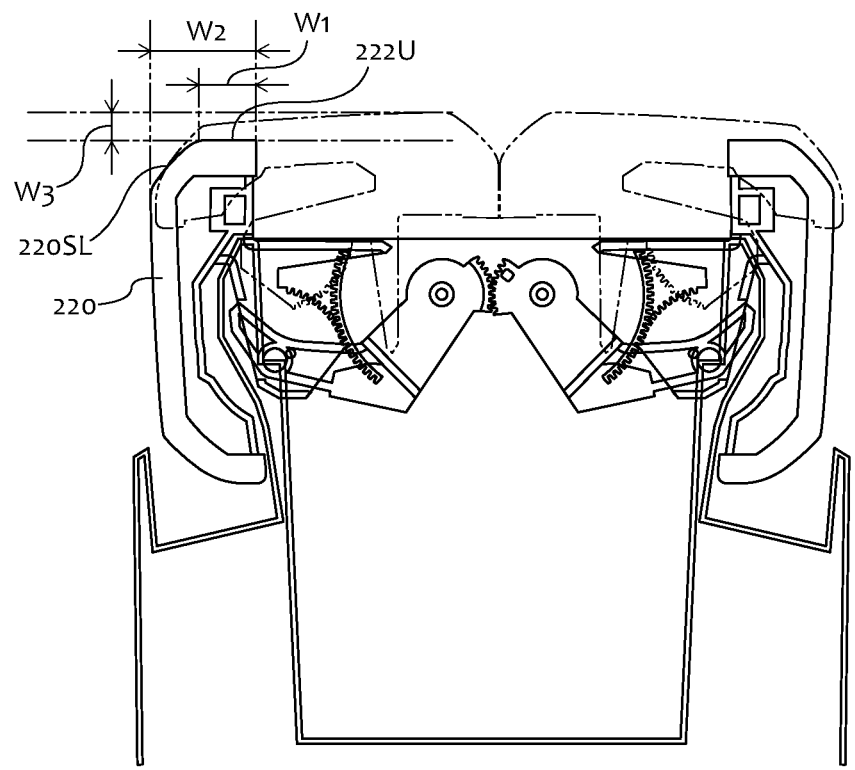
Figure 18:
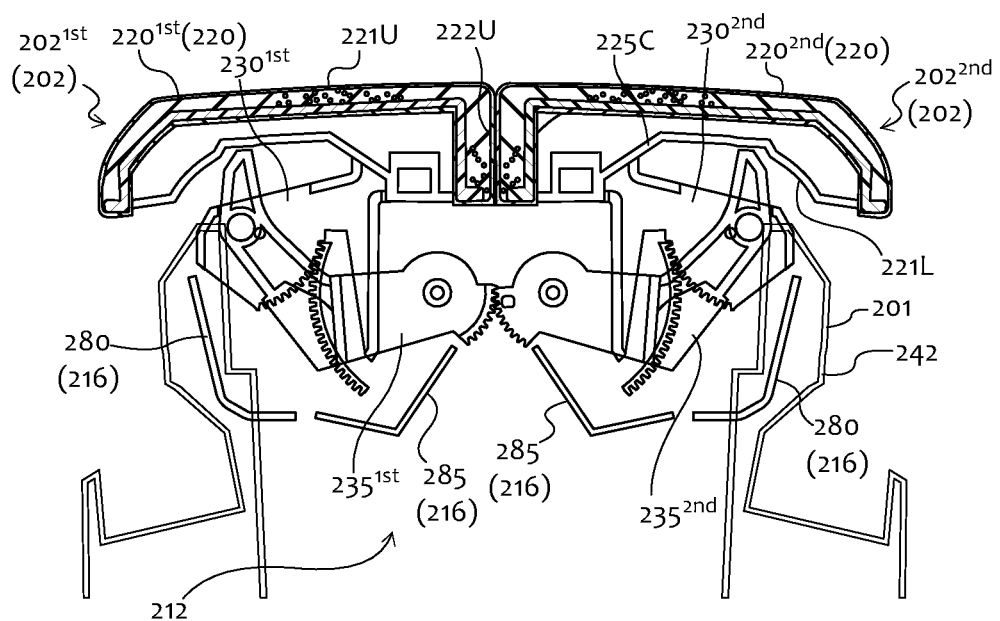
Figure 19:
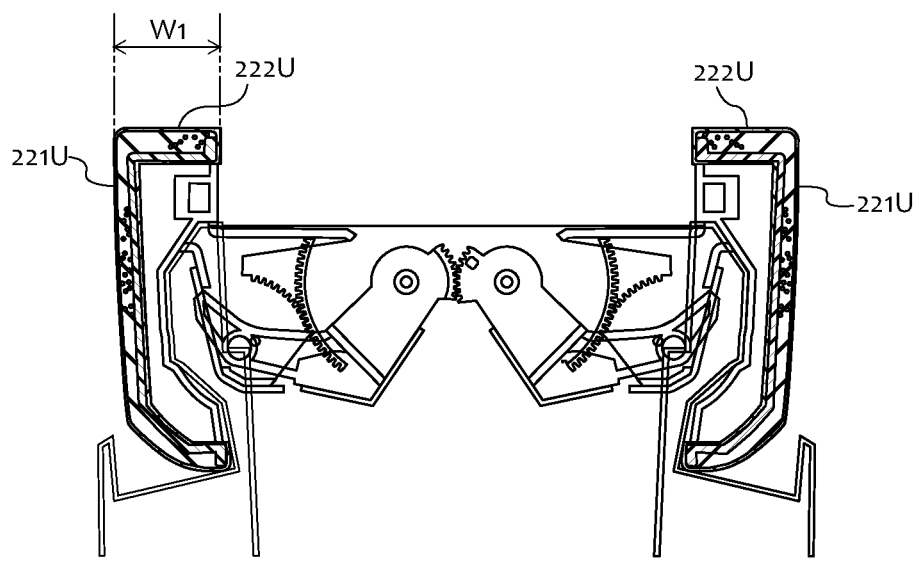
Figure 20:
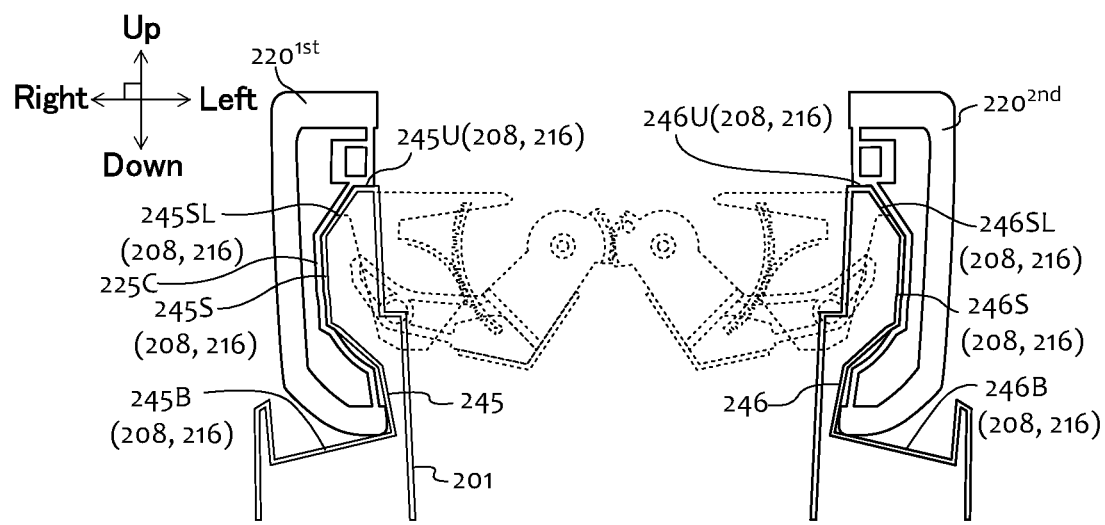
Figure 21:
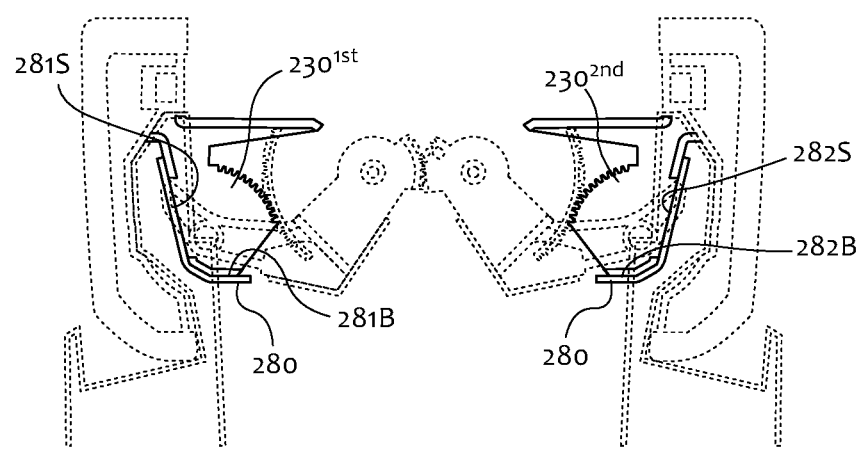
Figure 22:
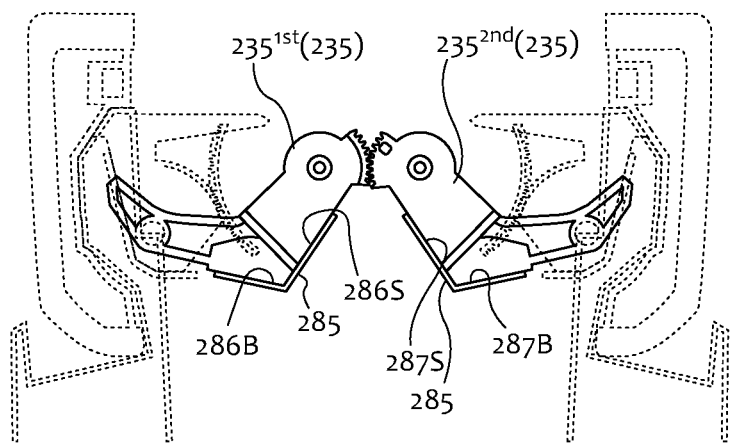

FIG. 9 schematically illustrates a box apparatus for vehicles in its disassembled state, according to a second embodiment;

FIG. 10 schematically illustrates the box apparatus for vehicles according to the second embodiment when lid bodies are at a closed position;

FIG. 11 schematically illustrates the box apparatus for vehicles according to the second embodiment when the lid bodies are at an opened position;

FIG. 12 illustrates an operation of the box apparatus for vehicles according to the second embodiment;

FIG. 13 illustrates the operation of the box apparatus for vehicles according to the second embodiment;

FIG. 14 illustrates the operation of the box apparatus for vehicles according to the second embodiment;

FIG. 15 illustrates the operation of the box apparatus for vehicles according to the second embodiment;

FIG. 16 illustrates the operation of the box apparatus for vehicles according to the second embodiment;

FIG. 17 illustrates the operation of the box apparatus for vehicles according to the second embodiment;

FIG. 18 illustrates an operation of a box apparatus for vehicles according to a third embodiment;

FIG. 19 illustrates the operation of the box apparatus for vehicles according to the third embodiment;

FIG. 20 illustrates the operation of the box apparatus for vehicles according to the third embodiment;

FIG. 21 illustrates the operation of the box apparatus for vehicles according to the third embodiment; and FIG. 22 illustrates the operation of the box apparatus for vehicles according to the third embodiment.

DOUBLE-DOORED LID APPARATUS ACCORDING TO FIRST MODE

In the double-doored lid apparatus having the aforementioned structure in which the two doors are opened and closed in conjunction with each other, backlash of a gear or a shaft or deformation of a link such as a hinge or an arm causes a difference between opening/closing motions of the two doors. Such a difference between the opening/closing motions of the two doors causes backlash between the two doors to be manifested when the vehicle is vibrated or an occupant touches one of the doors in the door-closed state. In order to inhibit occurrence of backlash between the doors due to the difference between the door opening/closing motions, it is effective to urge each door in its closed state in the opening direction by use of an urging member such as a rubber cushion. If both the two doors in their closed states are urged in the opening direction, the urging force inhibits occurrence of backlash between the two doors.

However, if the aforementioned urging member for urging the door in the opening direction to inhibit backlash between the two doors in the closed states is provided to each of the two doors, the following drawback occurs. That is, even if the press-closing operation is performed on one of the doors against the urging force of the corresponding urging member, since the urging force in the opening direction from the urging member corresponding to the other door is continuously applied during the press-closing operation, the urging force makes the closing motion of the other door difficult to follow the closing motion of the one door under the press-closing operation. Consequently, the other door does not reach a predetermined locking position, and locking of the two doors by the locking mechanism may not be achieved.

A double-doored lid apparatus according to a first mode is provided for the purpose of: inhibiting occurrence of backlash between two doors that are opened and closed in conjunction with each other, by use of an urging force in an opening direction from an urging member; and, when one of the two doors is subjected to a press-closing operation, allowing a closing motion of the other door to easily follow a closing motion of the one door by regulating application of the urging force in the opening direction from the urging member onto the other door that is not pressed.

In the double-doored lid apparatus according to the first mode, when a first door and a second door that are opened and closed in conjunction with each other are locked in their closed states, an urging force generated by the urging member is applied to both the doors via a support member. Therefore, occurrence of backlash between the two doors is inhibited by the urging force in the opening direction from the urging member. Further, while one of the first door and the second door presses the support member downward during its closing motion caused by a pressing operation, a second support portion, of the support member, for supporting the first door in its locked state and a third support portion, of the support member, for supporting the second door in its locked state are integrally moved relative to the box body. When the second support portion and the third support portion are integrally moved due to the press-closing operation performed on the one door, application of the urging force in the opening direction from the urging member via the support member onto the other door is regulated. Therefore, when the one door is closing due to the pressing operation while pressing the support member downward, the closing motion of the other door that is not subjected to the pressing operation easily follows the closing motion of the one door under the press-closing operation.

(Double-Doored Lid Apparatus According to Second Mode)

In recent years, interior equipment for vehicles is required to have many functions. Double-doored lid apparatuses mounted in vehicles are also required to have improved functions as arm rests. A double-doored lid apparatus according to a second mode, that is, a box apparatus for vehicles according to the second mode, is provided for the purpose of improving its function as an arm rest.

The box apparatus for vehicles according to the second mode is a double-doored lid apparatus mounted in a vehicle, and is embodied as, but is not limited to, a center console box disposed between a driver seat and a passenger seat. For example, the box apparatus for vehicles according to the second mode is also embodied as a side console box or a container holder. The container holder is disposed to the side of an occupant seat in the rear cabin of a vehicle, and accommodates and holds containers for beverages.

The box apparatus for vehicles according to the second mode includes a box, two lids, and a link element.

The box has an internal space, and an opening that serves as a boundary between the internal space and the outside, and faces upward. The box of the box apparatus for vehicles according to the second mode corresponds to the box body of the lid apparatus according to the first mode. One of the two lids of the box apparatus for vehicles according to the second mode corresponds to the first door of the lid apparatus according to the first mode while the other lid corresponds to the second door of the lid apparatus according to the first mode. Further, the link element of the box apparatus for vehicles according to the second mode corresponds to a part of the opening/closing mechanism of the lid apparatus according to the first mode.

Each of the lids of the box apparatus for vehicles according to the second mode includes a lid body and a pivotal shaft.

Of the lid, the lid body is a part that closes the opening at a closed position and opens the opening at an opened position, and the pivotal shaft is a part that is pivotally supported relative to the box. Each lid is considered to rotate relative to the box around the pivotal shaft.

When the two lids rotate, the lid body of each lid is positionally changed between the closed position and the opened position. The box apparatus for vehicles according to the second mode is a double-doored box apparatus in which each of the two lids is positionally changed between the closed position and the opened position.

When the lids rotate and the lid bodies are positionally changed between the closed position and the opened position, the direction of the lid bodies relative to the box is changed. Specifically, at the closed position, the two lid bodies of the two lids are disposed side by side with closed-position upper-surface portions thereof being upper surfaces. On the other hand, at the opened position, the two lid bodies of the two lids oppose each other across the opening, with opened-position upper-surface portions thereof being upper surfaces.

Each lid body includes an elastically deformable cushion portion and a base body portion harder than the cushion portion. The closed-position upper-surface portion and the opened-position upper-surface portion of the lid body are each formed of the cushion portion. Therefore, a cushioning property derived from the cushion portion is imparted to the lid body at the closed position or the opened position. Thus, the box apparatus for vehicles according to the second mode allows the opened-position upper-surface portion or the closed-position upper-surface portion of the lid body to be used as an arm rest.

When the closed-position upper-surface portion or the opened-position upper-surface portion is the cushion portion, an occupant who has hit his/her arm or elbow on the closed-position upper-surface portion or the opened-position upper-surface portion is less likely or unlikely to feel discomfort. Therefore, the box apparatus for vehicles according to the second mode is suitable as a box apparatus for vehicles to be mounted in a limited space such as a vehicle cabin.

Consequently, the box apparatus for vehicles according to the second mode is considered to have an improved function as an arm rest.

Hereinafter, the box apparatus for vehicles according to the second mode is described for each of components thereof.

As described above, the box of the box apparatus for vehicles according to the second mode has the internal space, and the opening that serves as a boundary between the internal space and the outside, and faces upward. Therefore, the internal space of the box is partitioned from the outside on at least the sides of the box. In this specification, a part of the box corresponding to the sides that partition the internal space of the box from the outside is referred to as a peripheral wall of the box.

The peripheral wall of the box may continuously or discontinuously surround the internal space of the box over the entire periphery.

The use of the internal space of the box is not particularly limited. For example, the internal space may be used as a chamber for housing articles or a space for installing audio equipment or the like.

The two lids are pivotally supported directly or indirectly relative to the box. That is, the two lids may be pivotally supported directly by the box, or may be pivotally supported by the box indirectly, i.e., via another member. Alternatively, the lids may be pivotally supported by another member that is not in contact with the box and does not positionally change relative to the box.

As described above, each lid body includes the elastically deformable cushion portion and the base body portion harder than the cushion portion. In other words, the cushion portion is softer than the base body portion.

The lid body of the box apparatus for vehicles according to the second mode is usable as an arm rest for an occupant. Therefore, the lid body is required to have enough strength to bear a load acting on the lid body when being used as an arm rest, and enough softness to make an occupant feel comfortable when he/she uses the lid body as an arm rest.

The base body portion is a portion relating to the strength of the lid body. Therefore, as for a material of the base body portion, a material having a relatively high strength is preferably selected. Examples of the material of the base body portion include resins such as polycarbonate, polypropylene, and ABS.

The cushion portion is a portion relating to the softness of the lid body. The cushion portion satisfies this requirement when it is elastically deformable. The cushion portion may have a solid shape or a hollow shape. In order to impart an excellent cushioning property to the cushion portion, the cushion portion is preferably formed of a porous material such as foamed polyurethane. The cushion portion may have a multilayer structure having a solid (i.e., nonporous) skin portion at a surface thereof.

The cushion portion may form at least the closed-position upper-surface portion and the opened-position upper-surface portion of the lid body as described above, and therefore may be provided to these portions only. However, preferably, the cushion portion continuously covers the surface of the base body portion. The "surface of the base body portion" means the design surface, of the base body portion, facing outward at the opened position and the closed position.

The lid body may have any shape as long as the lid body closes and opens the opening. For example, the lid body may have a plate shape, or a three-dimensional shape such as a curved shape or a bent shape.

Each of the closed-position upper-surface portion and the opened-position upper-surface portion of lid body preferably has a certain size enough to be used as an arm rest. The closed-position upper-surface portion is sufficiently large because the opening needs to be closed by this portion. Meanwhile, when reduction in size of the box apparatus for installation in a vehicle cabin is considered, the opened-position upper-surface portion of the lid body needs to be smaller than the closed-position upper-surface portion.

Therefore, the dimension of the opened-position upper-surface portion is considered to have a desirable range.

Specifically, the width of the opened-position upper-surface portion is preferably not less than 20 mm, more preferably not less than 25 mm, and further preferably not less than 30 mm. The "width of the opened-position upper-surface portion" means the length of each opened-position upper-surface portion in a direction connecting the two lid bodies that oppose each other across the opening at the opened position. For example, when the two lid bodies, at the opened position, oppose each other in the vehicle width direction across the opening, the width of the opened-position upper-surface portion may be rephrased as the length, in the vehicle width direction, of each lid body at the opened position.

The pivotal shaft is a part that is integrated with the lid body and is pivotally supported relative to the box. Therefore, each lid rotates around the pivotal shaft, and is positionally changed between the opened position and the closed position.

The pivotal shaft may be directly or indirectly integrated with the lid body. For example, the pivotal shaft may be directly provided to the lid body. Alternatively, the pivotal shaft may be provided to a leg portion integrated with the lid body. The leg portion may be composed of a single body or a plurality of separated bodies. For example, the leg portion may be composed of two separated bodies. In this case, one of the two bodies is adhered to the lid body, the other body is pivotally supported by the one body, a pivotal shaft is provided to the other body, and the pivotal shaft is pivotally supported relative to the box. In this case, since the lid body biaxially rotates, the movement locus of the lid body between the opened position and the closed position is advantageously made compact.

The box apparatus for vehicles according to the second mode preferably includes an urging element that urges the lid bodies from the closed position toward the opened position. In this case, the lid bodies are automatically positionally changed from the closed position to the opened position by the urging element. Further, in this case, the box apparatus for vehicles according to the second mode preferably includes a locking element that locks the lid bodies at the closed position against the urging force of the urging element.

The urging element and the locking element are not particularly limited, and a general urging element and locking element may be used.

For example, a torsion coil spring made of metal may be used as the urging element, and a heart cam may be used as the locking element.

As described above, the lid body of the box apparatus for vehicles according to the second mode is usable as an arm rest at the opened position and the closed position. Therefore, the box apparatus for vehicles according to the second mode preferably includes stoppers that regulate the position of each lid body at the opened position and the closed position. Of the stoppers, a stopper that regulates the position of the lid body at the opened position is referred to as an opening stopper, and a stopper that regulates the position of the lid body at the closed position is referred to as a closing stopper.

In order to efficiently regulate the position of each lid body, the opening stopper and the closing stopper are preferably located at distant positions from the center of rotation, i.e., the pivotal shaft, of the lid. The opening stopper and the closing stopper may be provided to a part, of the box apparatus for vehicles, other than the lid body. When the opening stopper and/or the closing stopper are provided to the box, the number of components of the box apparatus for vehicles is not increased, whereby the manufacturing cost is advantageously reduced.

The opening stopper may be in contact with the lid body itself at the opened position to regulate the position of the lid body, may be in contact with the leg portion at the opened position to regulate the position of the lid body via the leg portion, or may be in contact with any of other components of the lid to regulate the position of the lid body. The same applies to the closing stopper.

In any case, the opening stopper and the closing stopper are preferably located at a distant position from the pivotal shaft of the lid. Furthermore, as described above, when the lid body multiaxially rotates, such as when the leg portion is composed of a plurality of (two or more) separated bodies, the opening stopper and the closing stopper are preferably located at distant positions from all the pivotal shafts.

Although "distant position" means a position that is not physically in contact with the pivotal shaft, the distance between the opening stopper/closing stopper and the pivotal shaft is preferably great. Specifically, examples of ranges of preferable distances between the opening stopper and the pivotal shaft include not less than 2 cm, not less than 3 cm, not less than 5 cm, and not less than 7 cm. The preferable distance between the opening stopper and the pivotal shaft has no upper limit, but is preferably not greater than 30 cm for practicality. The same applies to preferable ranges of the distance between the closing stopper and the pivotal shaft.

The box apparatus for vehicles according to the second mode is used as an arm rest. In this regard, a difference between the position, in the up-down direction, of the opened-position upper-surface portion at the opened position and the position, in the up-down direction, of the closed-position upper-surface portion at the closed position is preferably small to prevent an occupant from feeling discomfort. The position in the up-down direction means a position in the up-down direction of the box apparatus for vehicles mounted in a vehicle cabin, i.e., a position in the up-down direction with the opening of the box facing upward.

Examples of ranges of preferable differences between the position, in the up-down direction, of the opened-position upper-surface portion at the opened position and the position, in the up-down direction, of the closed-position upper-surface portion at the closed position include not greater than 30 mm, not greater than 20 mm, not greater than 15 mm, not greater than 12 mm, not greater than 10 mm, and not greater than 5 mm.

First Embodiment

Hereinafter, a specific embodiment of the double-doored lid apparatus according to the first mode is described with reference to FIG. 1 to FIG. 8.

A double-doored lid apparatus 101 according to the present embodiment is, for example, a console box mounted to a center console disposed in the compartment of a vehicle. The double-doored lid apparatus 101 may be used as an arm rest on which an occupant puts his/her arm when doors 120 and 130 are in their closed states. In this embodiment, unless there are exceptional circumstances, the direction is described based on a vehicle in which the double-doored lid apparatus 101 is mounted. For example, "right side" indicates the right side of the vehicle in the vehicle traveling direction, and "left side" indicates the left side of the vehicle in the vehicle traveling direction.

Figure 1:
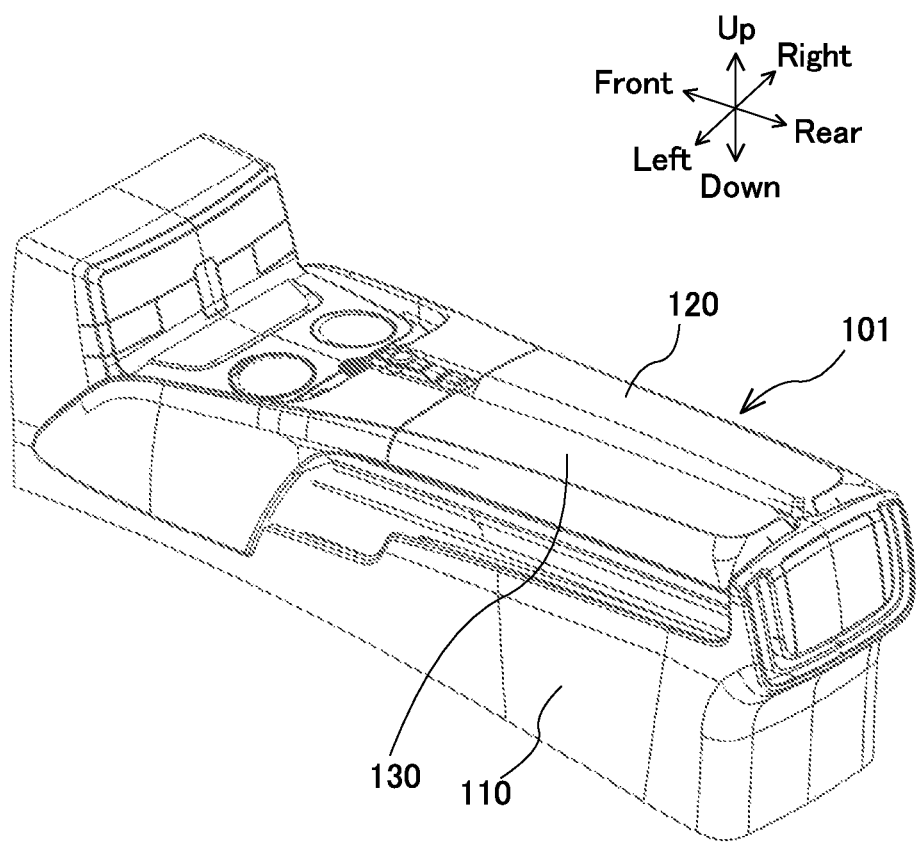
FIG. 1 is a perspective view of a double-doored lid apparatus in its closed state, according to a first embodiment.
Figure 2:
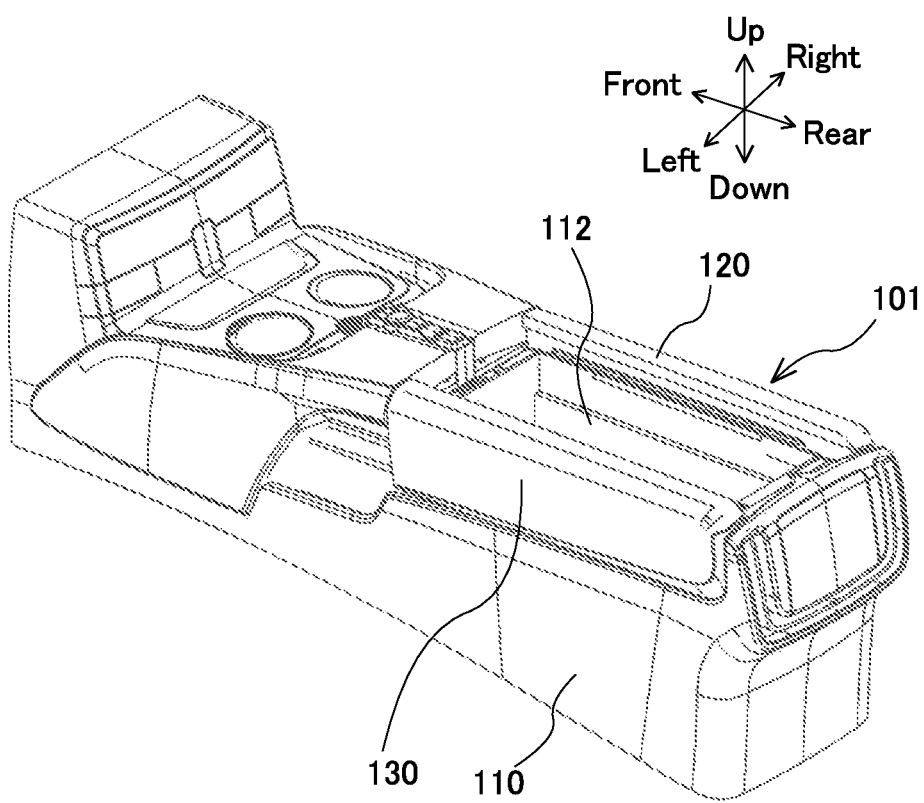
FIG. 2 is a perspective view of the double-doored lid apparatus in its opened state, according to the first embodiment.
Figure 3:
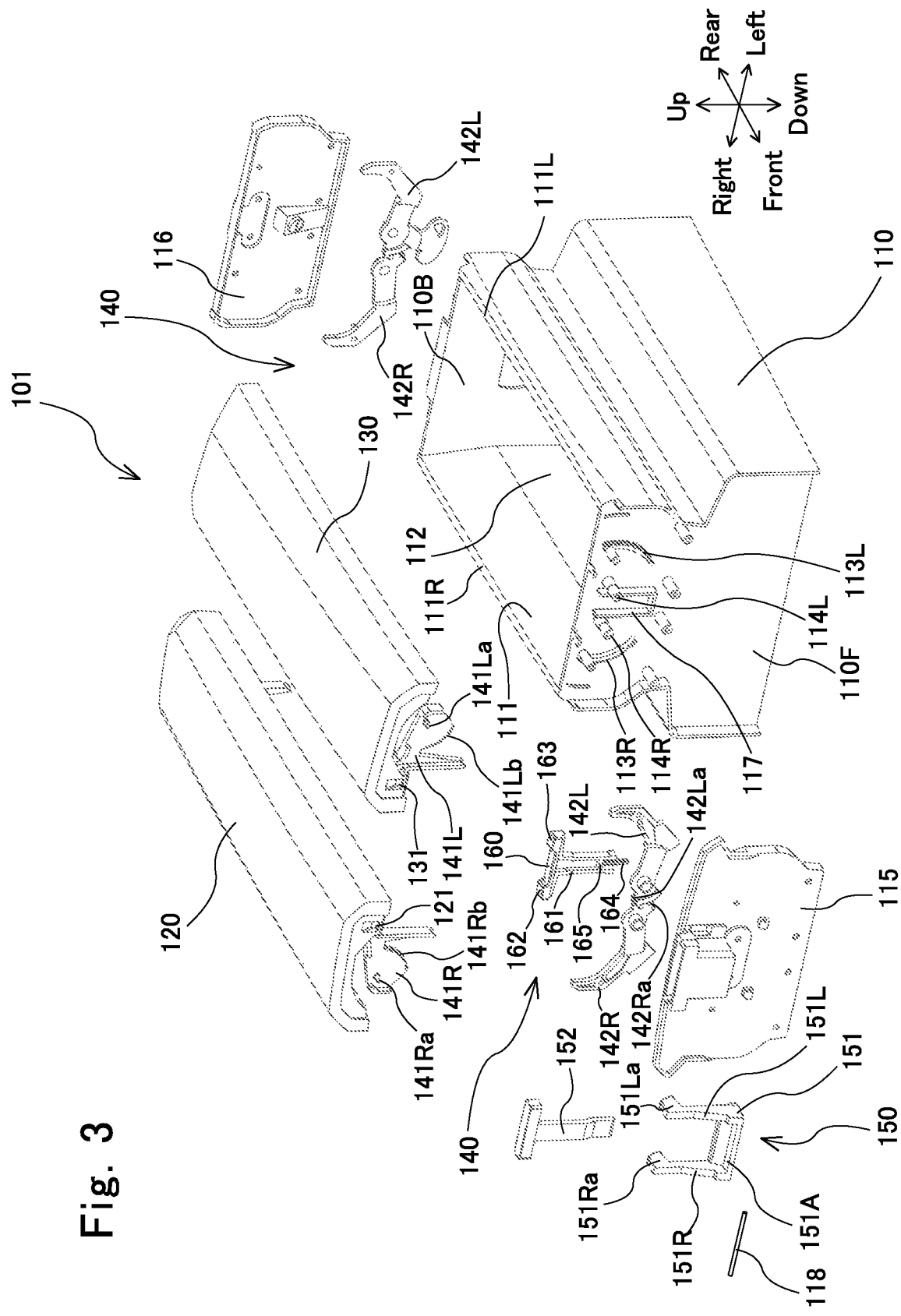
FIG. 3 is an exploded perspective view of the double-doored lid apparatus according to the first embodiment.
Figure 4:
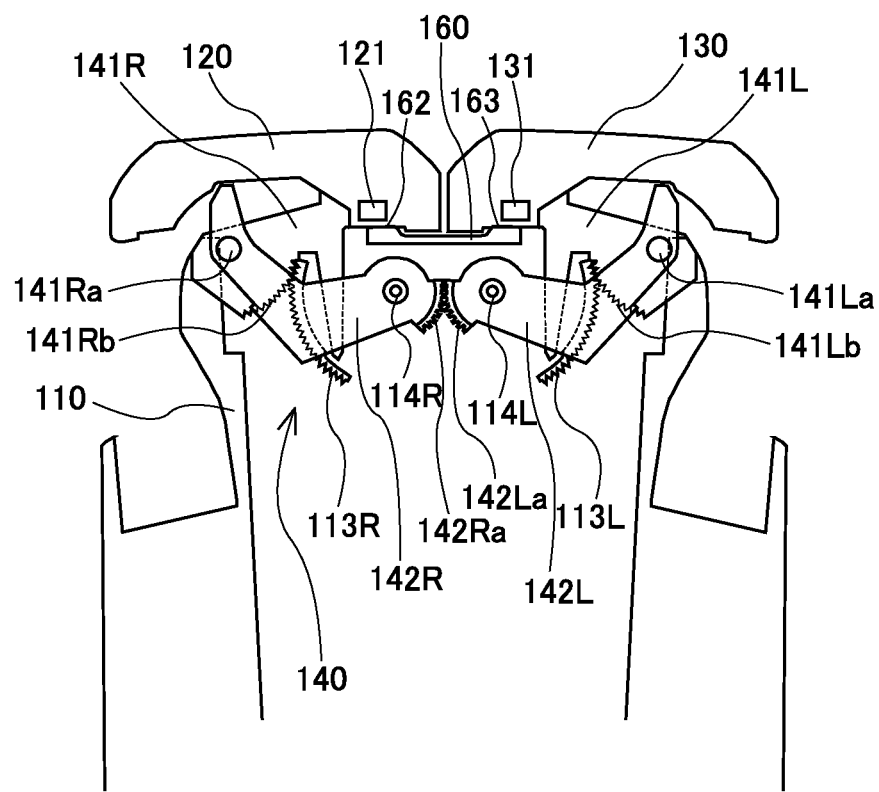
FIG. 4 illustrates an operation, in the closed state, of an opening/closing mechanism included in the double-doored lid apparatus according to the first embodiment.
Figure 5:
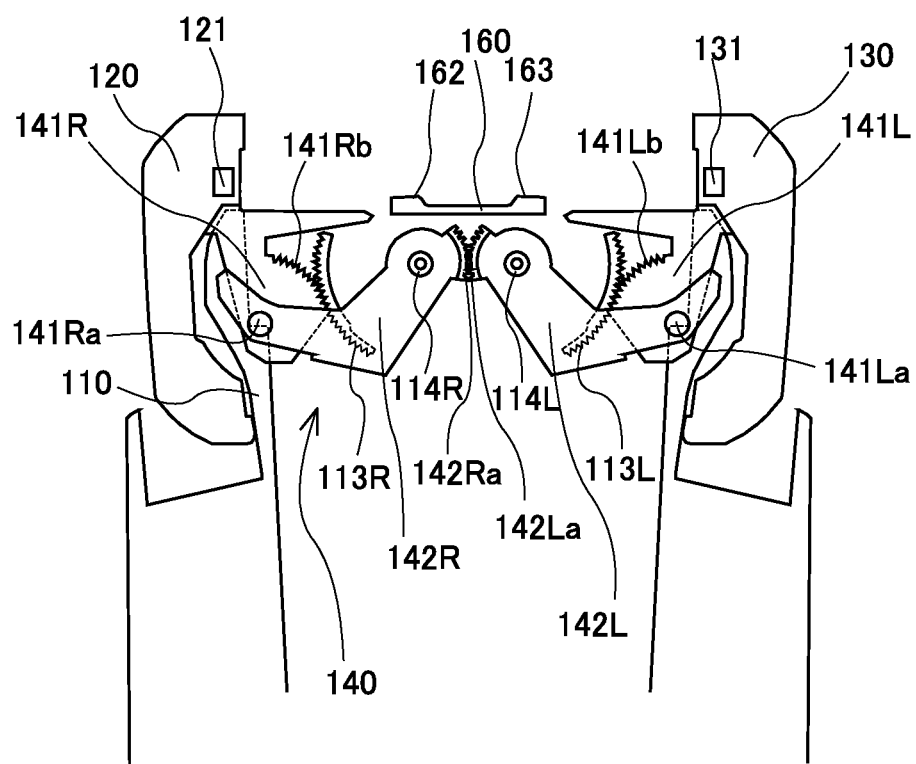
FIG. 5 illustrates an operation, in the opened state, of the opening/closing mechanism included in the double-doored lid apparatus according to the first embodiment.

As shown in FIG. 1, FIG. 2, and FIG. 3, the double-doored lid apparatus 101 includes a box body 110, two doors 120 and 130, an opening/closing mechanism 140, and a locking mechanism 150. As shown in FIG. 4 and FIG. 5, the double-doored lid apparatus 101 is configured such that the doors 120 and 130 are opened and closed relative to the box body 110 by the opening/closing mechanism 140 and the opening/closing motions of the doors 120 and 130 are in conjunction with each other.

The box body 110 is formed in a substantially box shape. The box body 110 is fixed to the vehicle body by bolt fastening or the like. The box body 110 has a storage portion 112. The storage portion 112 has an opening 111 at an upper surface and has a substantially rectangular-parallelepiped shape. The box body 110 may be any box body having a side wall and a bottom wall that surround the storage portion 112, and may include, for example, a frame for accommodating a cup holder or the like. The peripheral edge of the opening 111 includes two sides 111R and 111L extending in the front-rear direction of the vehicle. That is, the double-doored lid apparatus 101 is disposed such that the two sides 111R and 111L extend in the front-rear direction of the vehicle.

The door 120 is a lid formed in a substantially rectangular shape so as to correspond to the right half of the opening 111 of the box body 110. Hereinafter, the door 120 is referred to as a right door 120. The right door 120 covers the right half of the opening 111 of the box body 110 so as to be openable and closable. The right door 120 is openable and closable around a rotation shaft (hereinafter, referred to as a right rotation shaft) that extends in the front-rear direction along the side 111R, on the right side, of the peripheral edge of the opening 111, from the closed state in which the right door 120 covers the right half of the opening 111. The right door 120 is openable, relative to the box body 110, from the closed state to a fully-opened state at a predetermined angle (for example, 100°).

The door 130 is a lid formed in a substantially rectangular shape so as to correspond to the left half of the opening 111 of the box body 110. Hereinafter, the door 130 is referred to as a left door 130. The left door 130 covers the left half of the opening 111 of the box body 110 so as to be openable and closable. The left door 130 is openable and closable around a rotation shaft (hereinafter, referred to as a left rotation shaft) that extends in the front-rear direction along the side 111L, on the left side, of the peripheral edge of the opening 111, from the closed state in which the left door 130 covers the left half of the opening 111. The left door 130 is openable, relative to the box body 110, from the closed state to a fully-opened state at a predetermined angle (for example, 100°).

Figure 7:
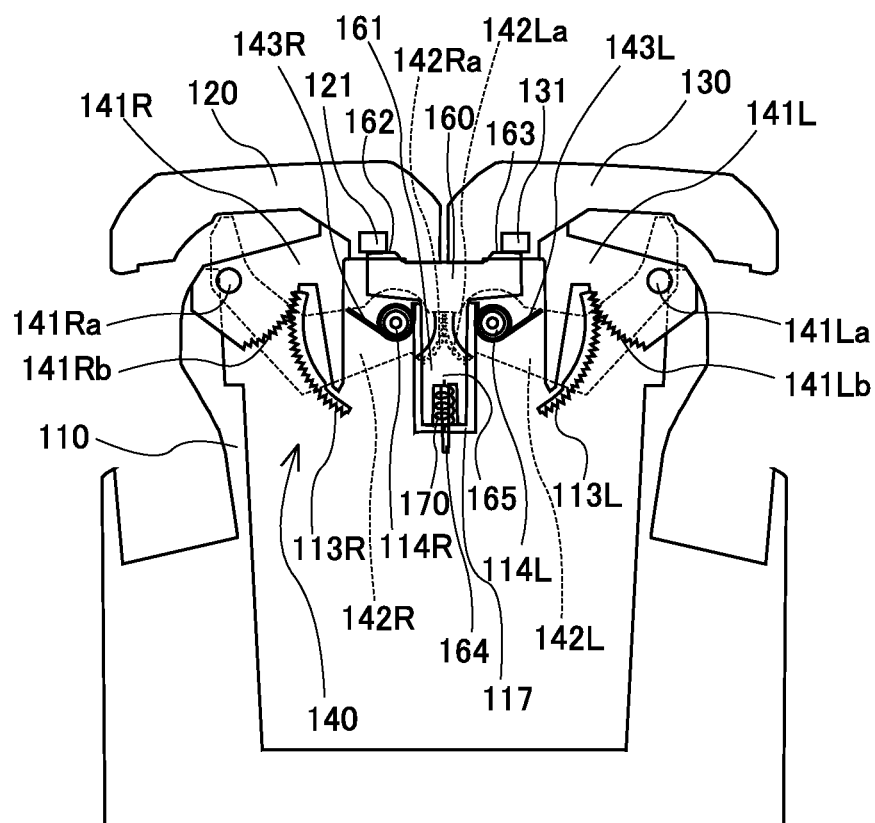
FIG. 7 illustrates operations of an urging member and a support member included in the double-doored lid apparatus according to the first embodiment.
Figure 8:
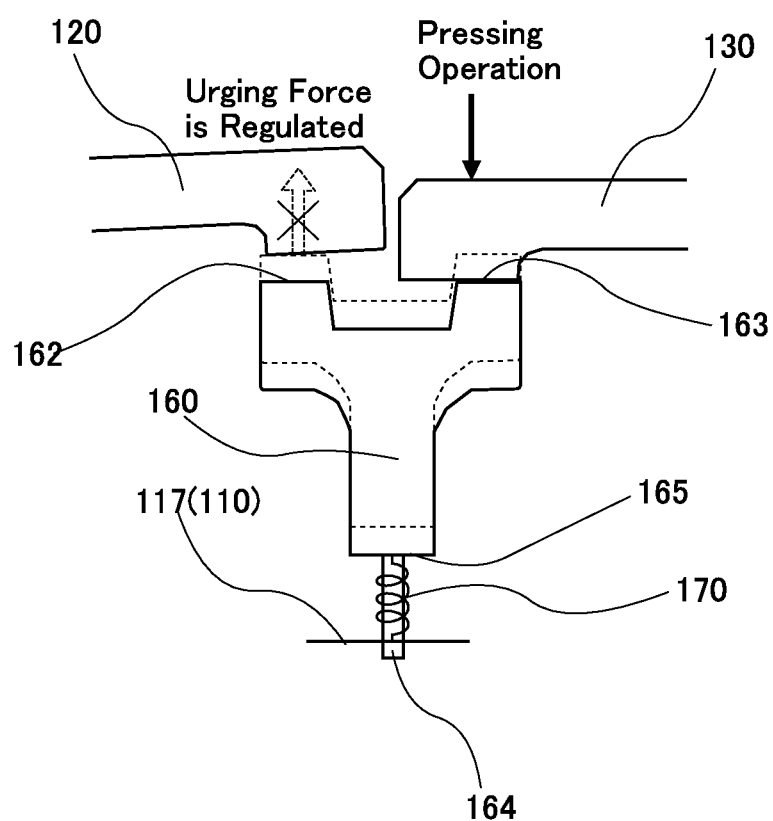
FIG. 8 is an enlarged view illustrating the operations of the urging member and the support member included in the double-doored lid apparatus according to the first embodiment.

The opening/closing mechanism 140 is a mechanism that opens and closes the right door 120 and the left door 130 in conjunction with each other. The opening/closing mechanism 140 opens and closes the right door 120 around the right rotation shaft along the side 111R on the right side, and opens and closes the left door 130 around the left rotation shaft along the side 111L on the left side. Two opening/closing mechanisms 140 are provided on the front side and the rear side of the box body 110, respectively, so as to be paired in the front-rear direction of the vehicle. As shown in FIG. 3 and FIG. 7, each opening/closing mechanism 140 has two hinge members 141R and 141L, two arm members 142R and 142L, and two spring members 143R and 143L.

The hinge member 141R is integrally mounted to the right door 120. The hinge member 141R has a shaft 141Ra and a gear 141Rb. The shaft 141Ra serves as an opening/closing center of the right door 120. The gear 141Rb is formed on a circular locus around the shaft 141Ra. A right gear 113R is provided on an outer surface of a front wall 110F or a rear wall 110B of the box body 110. The gear 141Rb of the hinge member 141R and the right gear 113R mesh with each other. The right door 120 is opened and closed while the meshing position between the gear 141Rb of the hinge member 141R and the right gear 113R is changed.

One end portion of the arm member 142R is supported by the shaft 141Ra of the hinge member 141R. The arm member 142R extends in the vehicle width direction from the center, in the vehicle width direction, of the box body 110 toward the right side. The other end portion of the arm member 142R is supported by a shaft 114R provided on the front wall 110F or the rear wall 110B of the box body 110. The arm member 142R is swingable relative to the box body 110 around the shaft 114R. When the arm member 142R swings around the shaft 114R, the one end portion of the arm member 142R moves up and down and thereby the meshing position between the gear 141Rb of the hinge member 141R and the right gear 113R changes, whereby the right door 120 is opened and closed.

A spring member 143R is mounted to the shaft 114R of the box body 110. The spring member 143R is disposed so as to annularly surround the shaft 114R. The spring member 143R is a torsion spring having one end portion supported by the box body 110 and the other end portion supported by the arm member 142R. The spring member 143R generates an urging force that causes the arm member 142R to swing in a direction of opening the right door 120. The urging force of the spring member 143R is maximum when the right door 120 is in the closed state.

The hinge member 141L is integrally mounted to the left door 130. The hinge member 141L has a shaft 141La and a gear 141Lb. The shaft 141La serves as an opening/closing center of the left door 130. The gear 141Lb is formed on a circular locus around the shaft 141La. A left gear 113L is provided on the front wall 110F or the rear wall 110B of the box body 110. The gear 141Lb of the hinge member 141L and the left gear 113L mesh with each other. The left door 130 is opened and closed while the meshing position between the gear 141Lb of the hinge member 141L and the left gear 113L is changed.

One end portion of the arm member 142L is supported by the shaft 141La of the hinge member 141L. The arm member 142L extends in the vehicle width direction from the center, in the vehicle width direction, of the box body 110 toward the left side. The other end portion of the arm member 142L is supported by a shaft 114L provided on the front wall 110F or the rear wall 110B of the box body 110. The arm member 142L is swingable relative to the box body 110 around the shaft 114L. When the arm member 142L swings around the shaft 114L, the one end portion of the arm member 142L moves up and down and thereby the meshing position between the gear 141Lb of the hinge member 141L and the left gear 113L changes, whereby the left door 130 is opened and closed.

A spring member 143L is mounted to the shaft 114L of the box body 110. The spring member 143L is disposed so as to annularly surround the shaft 114L. The spring member 143L is a torsion spring having one end portion supported by the box body 110 and the other end portion supported by the arm member 142L. The spring member 143L generates an urging force that causes the arm member 142L to swing in a direction of opening the left door 130. The urging force of the spring member 143L is maximum when the left door 130 is in the closed state.

A gear 142Ra is formed at the other end of the arm member 142R. A gear 142La is formed at the other end of the arm member 142L. The gear 142Ra and the gear 142La mesh with each other. The arm member 142R and the arm member 142L swing around the shafts 114R and 114L, respectively, in conjunction with each other while changing the meshing position between the gears 142Ra and 142La.

The locking mechanism 150 is a device that holds the right door 120 and the left door 130 in their closed states, and cancels the holding of the closed states. The locking mechanism 150 is provided only at the front part of the box body 110, that is, only at one side, in the longitudinal direction, of the right door 120 and the left door 130. The locking mechanism 150 includes a swing member 151 and an operation member 152. A front plate member 115 is mounted to the front wall 110F of the box body 110 so as to protect the arm members 142R and 142L. A rear plate member 116 is mounted to the rear wall 110B of the box body 110 so as to protect the arm members 142R and 142L.

Figure 6:
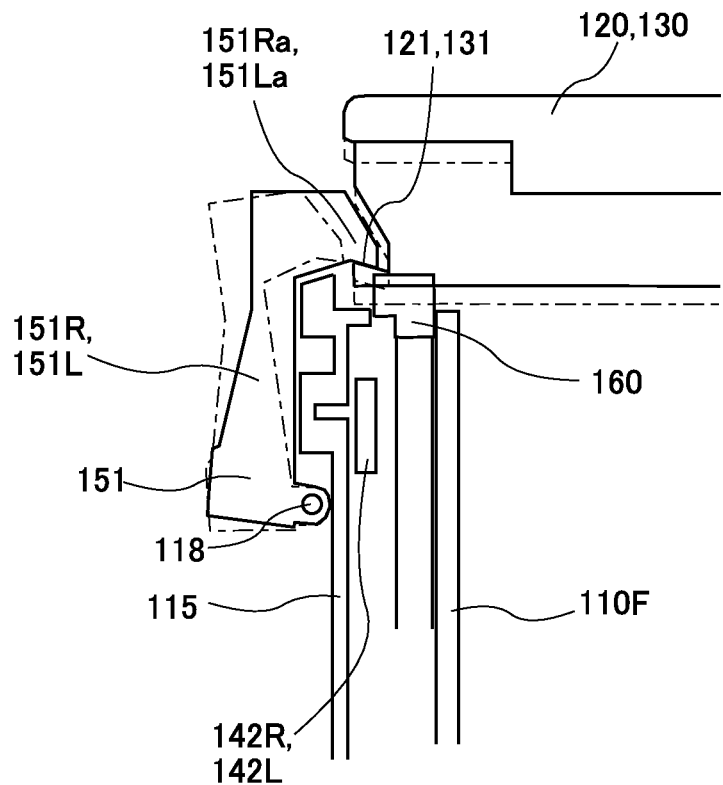
FIG. 6 illustrates an operation of a locking device included in the double-doored lid apparatus according to the first embodiment.

As shown in FIG. 6, the swing member 151 is swingably mounted to the front plate member 115 via a pin 118. The swing member 151 has two rod portions 151R and 151L separated from each other in the vehicle width direction. Each of the rod portions 151R and 151L extends upward from a plate-shaped body portion 151A of the swing member 151. Claw portions 151Ra and 151La are formed at leading ends of the rod portions 151R and 151L, respectively. The swing member 151 swings such that the claw portions 151Ra and 151La move in the front-rear direction.

The right door 120 has a hook portion 121. The hook portion 121 is formed in a groove shape, near the center, in the vehicle width direction, of the front part of the right door 120. A leading end of the claw portion 151Ra of the swing member 151 is caught and engaged with the hook portion 121. When the claw portion 151Ra is engaged with the hook portion 121, the right door 120 is locked in the closed state. When the engagement of the claw portion 151Ra with the hook portion 121 is canceled, the right door 120 is unlocked.

The left door 130 has a hook portion 131. The hook portion 131 is formed in a groove shape, near the center, in the vehicle width direction, of the front part of the left door 130. A leading end of a claw portion 151La of the swing member 151 is caught and engaged with the hook portion 131. When the claw portion 151La is engaged with the hook portion 131, the left door 130 is locked in the closed state. When the engagement of the claw portion 151La with the hook portion 131 is canceled, the left door 130 is unlocked.

A locking spring member (not shown) is interposed between the swing member 151 and the front plate member 115. The swing member 151 is urged by the locking spring member in a direction in which the claw portions 151Ra and 151La are engaged with the hook portion 121 of the right door 120 and the hook portion 131 of the left door 130, respectively. The swing member 151, in its normal state, is at a position where the claw portions 151Ra and 151La are engaged with the hook portion 121 of the right door 120 and the hook portion 131 of the left door 130, respectively.

The operation member 152 is mounted to the front plate member 115 so as to be movable up and down. The operation member 152 is disposed at the center, in the vehicle width direction, of the front plate member 115. The operation member 152 is a member formed in a T shape. The operation member 152, in its non-operating state, is held so as to be flushed with an upper end surface of the front plate member 115. The operation member 152 is pressed downward by the user. A lower end of the operation member 152 is brought into contact with the plate-shaped body portion 151A of the swing member 151. When a downward pressing force is applied from the operation member 152 to the plate-shaped body portion 151A of the swing member 151, the swing member 151 swings in an unlocking direction against the urging force of the locking spring member, whereby the engagement of the claw portions 151Ra and 151La with the hook portions 121 and 131 is canceled.

In the aforementioned double-doored lid apparatus 101, the claw portion 151Ra of the swing member 151 of the locking mechanism 150 is engaged with the hook portion 121 of the right door 120 while the claw portion 151La of the swing member 151 of the locking mechanism 150 is engaged with the hook portion 131 of the left door 130, whereby both the right door 120 and the left door 130 are locked in their closed states against the urging forces of the spring members 143R and 143L.

While the right door 120 and the left door 130 are locked in the closed states, if the operation member 152 is pressed downward by the user, a downward pressing force is applied from the operation member 152 to the plate-shaped body portion 151A of the swing member 151, and a force that causes the swing member 151 to swing around the pin 118 is applied to the swing member 151. When this force causes the swing member 151 to swing frontward against the urging force of the locking spring member, engagement of the claw portions 151Ra and 151La of the swing member 151 with the hook portions 121 and 131 of the doors 120 and 130 is canceled. In this case, the locking of the doors 120 and 130 in the closed states is canceled. When the locking has been canceled, the right door 120 and the left door 130 are urged in the opening direction by the urging forces of the locking spring members 143R and 143L, and are opened in conjunction with each other. This opening motion is continued until the doors 120 and 130 are fully opened. A difference in amount of motion or timing of motion occurs between the opening motion of the right door 120 and the opening motion of the left door 130 due to backlash, deformation, or the like. After start of the opening motions of the right door 120 and the left door 130, if the operation of pressing the operation member 152 by the user is canceled, the swing member 151 swings rearward due to the urging force of the locking spring member.

While the right door 120 and the left door 130 are fully opened, if either one of the doors 120 and 130 is pressed in a closing direction (mainly, downward) by the user, the one door 120 or 130 is closed against the urging forces of the spring members 143R and 143L. When the one door 120 or 130 is closed, the other door 130 or 120 is closed in conjunction with the closing motion of the one door 120 or 130 by the function of the opening/closing mechanism 140. A difference in amount of motion or timing of motion occurs between the closing motion of the right door 120 and the closing motion of the left door 130 due to backlash, deformation, or the like of the members.

When the aforementioned closing motions continue and the rear surfaces of the doors 120 and 130 press down the upper surfaces of the claw portions 151Ra and 151La of the swing member 151, the swing member 151 swings frontward, whereby the doors 120 and 130 further continue the closing motions. When the closing motions of the doors 120 and 130 have been continued up to a predetermined locking position at which the leading end of the claw portion 151Ra of the swing member 151 is caught by the hook portion 121 of the right door 120 and the leading end of the claw portion 151La of the swing member 151 is caught by the hook portion 131 of the left door 130, the right door 120 is locked in the closed state and the left door 130 is locked in the closed state.

As described above, according to the double-doored lid apparatus 101, the right door 120 and the left door 130 are opened from the closed states to the fully-opened states through the pressing operation to the operation member 152. Further, when either one of the right door 120 and the left door 130 in the fully-opened states is pressed downward, the one door 120 or 130 is closed from the fully-opened state to the closed state while the other door 130 or 120, which is not pressed, is closed from the fully-opened state to the closed state in conjunction with the closing motion of the one door 120 or 130 by the function of the opening/closing mechanism 140. Thus, both the doors 120 and 130 are locked in the closed states at the predetermined locking position by the locking mechanism 150.

In the structure of the double-doored lid apparatus 101 in which the two doors 120 and 130 are opened and closed in conjunction with each other, a difference occurs between the opening/closing motions of the two doors 120 and 130 due to, for example, backlash between the gears 142Ra and 142La of the arm members 142R and 142L, backlash between the shafts 141Ra and 141La, or deformation of the hinge members 141R and 141L or the arm members 142R and 142L. Such a difference between the door opening/closing motions causes backlash between the two doors 120 and 130 to be manifested when the vehicle vibrates or an occupant touches one of the doors 120 and 130. Therefore, in the double-doored lid apparatus 101 according to the present embodiment, occurrence of backlash between the two doors 120 and 130 which move in conjunction with each other is inhibited.

That is, as shown in FIG. 3 and FIG. 7, the double-doored lid apparatus 101 includes a support member 160 and an urging member 170. One support member 160 and one urging member 170 are provided on the front side of the box body 110. The support member 160 is a member formed in a T-shape. The support member 160 is movable in the up-down direction relative to the front wall 110F of the box body 110. The support member 160 has: a base portion 161 extending in the up-down direction; a right wing portion 162 extending rightward in the vehicle width direction from an upper part of the base portion 161; and a left wing portion 163 extending leftward in the vehicle width direction from the upper part of the base portion 161. The support member 160 is disposed with respect to the box body 110 such that upper-surface height positions of the right wing portion 162 and the left wing portion 163 are substantially aligned with each other.

A bar-shaped insertion portion 164, into which the urging member 170 is inserted, is formed in a lower part of the base portion 161 of the support member 160. A frame-shaped outer frame portion 117, which takes the outer shape of the base portion 161 of the support member 160, is formed on the front wall 110F of the box body 110. The support member 160 moves up and down within the outer frame portion 117 while being guided along the inner surface of the outer frame portion 117. The urging member 170 is a spring having one end portion supported by the outer frame portion 117 of the box body 110 and the other end portion supported by the support member 160, while being inserted into the insertion portion 164 of the support member 160. The urging member 170 generates an urging force that urges the support member 160 upward relative to the box body 110. The support member 160 transmits the urging force generated by the urging member 170 to the doors 120 and 130. When the right door 120 and the left door 130 are locked in the closed states, the urging force generated by the urging member 170 urges these doors in the opening direction via the support member 160.

A bottom-surface seat portion 165 of the support member 160 is a support portion that supports the other end portion of the urging member 170. The right wing portion 162 is a support portion that comes into contract with the rear surface of the right door 120 and supports the right door 120. The right wing portion 162 starts to come into contact with the right door 120 before the right door 120 reaches the predetermined locking position during the closing motion of the right door 120 from the opened state to the closed state, and continues to be in contact with the right door 120 even after the right door 120 has reached the predetermined locking position and been locked in the closed state, thereby supporting the right door 120. The left wing portion 163 is a support portion that comes into contact with the rear surface of the left door 130 and supports the left door 130. The left wing portion 163 starts to come into contact with the left door 130 before the left door 130 reaches the predetermined locking position during the closing motion of the left door 130 from the opened state to the closed state, and continues to be in contact with the left door 130 even after the left door 130 has reached the predetermined locking position and been locked in the closed state, thereby supporting the left door 130.

In the aforementioned double-doored lid apparatus 101, in the closed state where both the right door 120 and the left door 130 are locked at the predetermined locking position, the urging force generated by the urging member 170 is applied to the right door 120 and the left door 130 via the support member 160. In the locked and closed state, the right door 120 and the left door 130 are pressed upward and urged in the opening direction by the urging force of the urging member 170. Therefore, when a difference occurs between the opening/closing motions of the doors 120 and 130 due to backlash between the gears 142Ra and 142La of the arm members 142R and 142L, backlash between the shafts 141Ra and 141La, or deformation of the hinge members 141R and 141L or the arm members 142R and 142L while the doors 120 and 130 are locked in the closed states, if the vehicle vibrates or an occupant touches one of the doors 120 and 130, occurrence of backlash between the two doors 120 and 130 is inhibited by the urging force of the urging member 170.

When the two doors 120 and 130 are opened from the closed states, application of the urging force from the urging member 170 to the doors 120 and 130 is canceled at a timing in the middle of the opening motions of the doors 120 and 130. After the cancellation of the urging force, when either one of the doors 120 and 130, which are in the opened states, is pressed downward to be closed, the other door 130 or 120, which is not pressed, is closed in conjunction with the closing motion of the one door 120 or 130 being pressed.

When either one of the doors 120 and 130 is pressed downward to be closed as described above, as shown in FIG. 8, the rear surface of the one door 120 or 130 comes into contact with the upper surface of the right wing portion 162 or the left wing portion 163 of the support member 160 and presses the support member 160 downward at a timing in the middle of the closing motion. When the support member 160 is pressed downward due to the contact of the one door 120 or 130 being pressed to the corresponding wing portion 162 or 163, the urging force is applied from the urging member 170 to the one door 120 or 130 via the support member 160. The urging force applied to the one door 120 or 130 is increased as the closing motion of the one door 120 or 130, i.e., the pressing-down of the support member 160, is progressed. As described above, a difference may occur between the synchronized closing motions of the doors 120 and 130 due to backlash or deformation of the members. Depending on the backlash or deformation of the members, after the downward pressing of the one door 120 or 130 has been started and before the one door 120 or 130 comes into contact with the upper surface of the support member 160, the other door 130 or 120, which is not pressed, may start to come into contract with the upper surface of the support member 160.

When the support member 160 is pressed downward with the pressing of the one door 120 or 130, during the pressing-down process, one wing portion 162 or 163, of the support member 160, with which the one door 120 or 130 being pressed comes into contact, and the other wing portion 163 or 162 corresponding to the other door 130 or 120, which is not pressed, integrally move downward relative to the box body 110. When the one door 120 or 130 is pressed, if the other wing portion 163 or 162 corresponding to the other door 130 or 120, which is not pressed, moves downward integrally with the one wing portion 162 or 163 with which the one door 120 or 130 being pressed comes into contact, the urging force in the opening direction is not applied from the urging member 170 through the support member 160 to the non-pressed other door 130 or 120, or the urging force applied in the opening direction is not increased. Thus, application of the urging force is regulated. Therefore, when the one door 120 or 130 is closing while pressing the support member 160 downward through the pressing operation, the other door 130 or 120, which is not pressed, is allowed to easily follow the closing motion of the one door 120 or 130 under the press-closing operation.

Consequently, according to the double-doored lid apparatus 101, occurrence of backlash between the two doors 120 and 130 which are opened and closed in conjunction with each other is inhibited by the urging force in the opening direction from the urging member 170, and simultaneously, when either one of the doors 120 and 130 is pressed to be closed, the urging force in the door opening direction from the urging member 170 to the other door 130 or 120 which is not pressed is regulated, thereby allowing the closing motion of the other door 130 or 120 to easily follow the closing motion of the one door 120 or 130. Therefore, the non-pressed other door 130 or 120, which is not the one door 120 or 130 being pressed, is easily drawn in, in other words, easily reaches, the predetermined locking position, whereby the two doors 120 and 130 are easily locked in the closed states by the locking mechanism 150. Thus, opening/closing operability and opening/closing operation feeling for the doors 120 and 130 are improved.

In the above embodiment, the right door 120 and the left door 130 correspond to "first door" and "second door" described in the claims. The support member 160 corresponds to "support member" described in the claims. The bottom-surface seat portion 165 corresponds to "first support portion" described in the claims. The right wing portion 162 and the left wing portion 163 correspond to "second support portion" and "third support portion" described in the claims. The urging member 170 corresponds to "urging member" described in the claims.

In the above embodiment, the support member 160 and the urging member 170 are provided on one side (specifically, the front side), in the longitudinal direction, of the box body 110. However, the present invention is not limited thereto. The support member 160 and the urging member 170 may be provided on the rear side of the box body 110, or may be provided on the both sides, in the longitudinal direction, of the box body 110.

Second Embodiment

A box apparatus for vehicles according to a second embodiment is obtained by embodying a box apparatus for vehicles according to the second mode as a center console box to be disposed between a driver seat and a passenger seat.

FIG. 9 schematically shows a box apparatus for vehicles in a disassembled state, according to the second embodiment. FIG. 10 schematically shows the box apparatus for vehicles according to the second embodiment in which the lid bodies are at a closed position. FIG. 11 schematically shows the box apparatus for vehicles according to the second embodiment in which the lid bodies are at an opened position. FIG. 12 to FIG. 17 illustrate the operation of the box apparatus for vehicles according to the second embodiment. Specifically, FIG. 12 to FIG. 14 show the box apparatus for vehicles according to the second embodiment in which the lid bodies are at the closed position, FIG. 16 and FIG. 17 show the box apparatus for vehicles according to the second embodiment in which the lid bodies are at the opened position, and FIG. 15 shows the box apparatus for vehicles according to the second embodiment in which the lid bodies are at a half-opened position between the closed position and the opened position.

According to need, the box apparatus for vehicles with the lid bodies being at the closed position is referred to as "closed state", the box apparatus for vehicles with the lid bodies being at the opened position is referred to as "opened state", and the box apparatus for vehicles with the lid bodies being at the half-opened position is referred to as "semi-opened state".

Further, up, down, left, right, front, and rear respectively refer to up, down, left, right, front, and rear shown in FIG. 9. An up-down direction is a vertical direction, a left-right direction is a vehicle width direction, and a front-rear direction is a vehicle traveling direction.

The box apparatus for vehicles according to the second embodiment has a box 201, two covers 219, two lids 202, two link elements 205, two urging elements 206, and a locking element 207.

As shown in FIG. 9, the box 201 has a box shape whose longitudinal direction is in the front-rear direction. The box 201 has an internal space 211 having an opening 210 facing upward. The internal space 211 is partitioned from the outside at the sides and the bottom thereof by a peripheral wall 212 and a bottom wall 213 of the box 201. As shown in FIG. 12, the peripheral wall 212 of the box 201 has a double-layer structure including an inner peripheral wall 241 and an outer peripheral wall 242. The bottom wall 213 of the box 201 is integrated with the inner peripheral wall 241 of the peripheral wall 212.

Apart, of the outer peripheral wall 242 of the box 201, located on the front side is referred to as a front wall 243, and a part, of the outer peripheral wall 242, located on the rear side is referred to as a rear wall 244.

Each of the front wall 243 and the rear wall 244 has two pivotal shaft receiving portions 214 and two guide racks 215. The two pivotal shaft receiving portions 214 pivotally support pivotal shafts 237 described later. The two guide racks 215 mesh with guide gear trains 231 provided in lid-side leg portions 230 described later. Each guide rack 215 has an arc shape centered around the corresponding pivotal shaft receiving portion 214.

Further, the front side of the front wall 243 and the rear side of the rear wall 244 are covered with the covers 219. The covers 219 are fixed to the corresponding front wall 243 and rear wall 244.

Box apparatus constituting members, such as the pivotal shaft receiving portion 214 and the guide rack 215, as well as a later-described urging element 206, link-side leg portion 235, lid-side leg portion 230, and locking element 207, are housed between the cover 219 and the front wall 243 and between the cover 219 and the rear wall 244.

Each of the two lids 202 has a lid body 220, two lid-side leg portions 230, and two link-side leg portions 235. Each of the link-side leg portions 235 is integrated with one of link gear trains 250 constituting the link element 205. The link element 205 is described later.

Each lid body 220 has a substantially rectangular shape and a substantially plate shape as shown in FIG. 9 to FIG. 11, and the longitudinal direction thereof is the front-rear direction. Each lid body 220 has: a closed-position upper-surface portion 221U which is an upper surface at the closed position shown in FIG. 10; a closed-position lower-surface portion 221L which is a lower surface at the closed position (refer to FIG. 9 and FIG. 12); an opened-position upper-surface portion 222U which is an upper surface at the opened position shown in FIG. 11; and an opened-position lower-surface portion 222L which is a lower surface at the opened position. At the closed position shown in FIG. 10 and FIG. 12, the closed-position lower-surface portion 221L opposes the internal space 211 of the box 201. At the closed position, the opened-position upper-surface portion 222U is located inside in the left-right direction, i.e., the vehicle width direction, and the opened-position lower-surface portion 222L is located outside in the vehicle width direction.

A part of each lid body 220 between the closed-position upper-surface portion 221U and the opened-position upper-surface portion 222U is chamfered to be a sloped surface 220SL.

As shown in FIG. 12, each lid body 220 has a base body portion 225 and a cushion portion 228. The base body portion 225 is formed from acrylonitrile-butadiene-styrene copolymer resin (so-called ABS resin), and has a plate shape. The base body portion 225 is obtained by assembling and integrating two separated bodies, i.e., a base main body 225M and a base body cover 225C. The base main body 225M is covered with the cushion portion 228 at a part on the closed-position upper-surface portion 221U side, a part on the opened-position upper-surface portion 222U side, and a part on the opened-position lower-surface portion 222L side. The cushion portion 228 is composed of foamed polyurethane and a skin layer formed on the surface of the foamed polyurethane, and is softer and more elastically deformable than the base body portion 225.

The base body cover 225C is integrated with the base main body 225M so as to cover the base main body 225M at a part on the closed-position lower-surface portion 221L side. The base body cover 225C is provided with a recessed lock receiving portion 276 which constitutes a part of the locking element 207 described later. The lid-side leg portion 230 is integrally provided to each of two end portions in the longitudinal direction of the base body cover 225C, i.e., to a front end portion and a rear end portion of the base body cover 225C. The respective lid-side leg portions 230 each have a guide gear train 231 which meshes with the guide rack 215, and are pivotally supported by different link-side leg portions 235.

Specifically, as shown in FIG. 14, each lid-side leg portion 230 is provided with a protruding lid-side pivotal support portion 232. As shown in FIG. 13, each link-side leg portion 235 is provided with a recessed link-side pivotal support portion 236. The lid-side pivotal support portion 232 of each lid-side leg portion 230 is inserted in the link-side pivotal support portion 236 of the corresponding link-side leg portion 235, and each lid-side leg portion 230 is pivotally supported by the corresponding link-side leg portion 235. The aforementioned guide gear train 231 is arranged in an arc shape centered around the lid-side pivotal support portion 232 which is provided on the same lid-side leg portion 230.

As shown in FIG. 13, each link-side leg portion 235 has a pivotal shaft 237 in addition to the link-side pivotal support portion 236 described above. Each pivotal shaft 237 is pivotally supported by each of two pivotal shaft receiving portions 214 provided on each of the front wall 243 and the rear wall 244 of the box 201. Therefore, each lid 202 is considered to be pivotally supported by the box 201 via the corresponding pivotal shaft 237.

The urging element 206 is mounted to each of the two pivotal shafts 237 pivotally supported at the front wall 243. The urging element 206 is a torsion coil spring. As shown in FIG. 12, one end 260 of the urging element 206 is mounted to the link-side leg portion 235 while the other end 261 thereof is mounted to the cover 219. In other words, the one end of the urging element 206 is mounted to the lid 202 while the other end thereof is mounted to the box 201 via the cover 219. Due to an urging force of the urging element 206, the lid 202 is urged from the closed position shown in FIG. 10 and FIG. 12 toward the opened position shown in FIG. 11 and FIG. 16.

The box apparatus for vehicles according to the second embodiment has the two link elements 205. The link elements 205 are integrated with a front part and a rear part of the lid 202. As shown in FIG. 12, each link element 205 has two link gear trains 250 integrated with the respective link-side leg portions 235. Each of the two link gear trains 250 is a gear train arranged in an arc shape centered around the pivotal shaft 237 which is provided on the same link-side leg portion 235. The two link gear trains 250 mesh with each other.

As shown in FIG. 9, the locking element 207 has a switch portion 270 and a lock portion 271. The switch portion 270 is mounted between the front wall 243 and the cover 219. The switch portion 270 has a substantially rod-like shape. As shown in FIG. 10 and FIG. 11, an upper end 270U of the switch portion 270 is exposed on the upper side of the box 201. A lower end 270L of the switch portion 270 shown in FIG. 9 is located on the front side of an input portion 275 of the lock portion 271 described later, between the front wall 243 and the cover 219 covering the front wall 243.

As shown in FIG. 9, the lock portion 271 has a substantially U-shape, and includes: two hook portions 272 each having a hook-shaped hook head portion 273 and a rod-shaped hook leg portion 274; and a rod-shaped input portion 275 connecting the two hook portions 272. The hook portions 272 are disposed substantially in the up-down direction with the hook head portions 273 facing upward. The input portion 275 connects the lower ends of the hook leg portions 274. A pivotal shaft 275A of the input portion 275 is pivotally supported by a support portion 219S of the cover 219, and the lock portion 271 rotates relative to the cover 219.

The lock portion 271 is urged by an urging force of a lock urging element (not shown) in a direction in which the hook head portions 273 are brought close to the rear side, i.e., the lid 202, around the pivotal shaft 275A of the input portion 275. The hook head portions 273 urged by the lock urging element are engaged with the lock receiving portions 276 of the lid bodies 220 at the closed position. Engagement of the hook head portions 273 with the lock receiving portions 276 causes the lid bodies 220 to be locked at the closed position.

The input portion 275 of the lock portion 271 is disposed below the lower end 270L of the switch portion 270. Therefore, when the switch portion 270 is pressed downward, the input portion 275 is pressed downward. Thus, the lock portion 271 rotates in a direction in which the hook head portions 273 move away from the lids 202, around the pivotal shaft 275A of the input portion 275, against the urging force of the lock urging element. At this time, the engagement of the hook head portions 273 with the lock receiving portions 276 is canceled.

The operation of the box apparatus for vehicles according to the second embodiment is described below.

At the closed position shown in FIG. 10 and FIG. 12, the lid bodies 220 cover the opening 210 of the box 201, with the closed-position upper-surface portions 221U facing upward. At this time, the lid bodies 220 are locked at the closed position by the locking element 207. At this time, each lid body 220 is in contact with a part of the upper surface of the box 201, although not shown in the drawings. This part of the box 201 functions as a closing stopper, and supports the lid body 220 from the lower side. Therefore, at this time, the lid body 220 is stably maintained at the closed position.

As shown in FIG. 12, the closed-position upper-surface portion 221U of each lid body 220 is formed of the cushion portion 228. Since the cushion portion 228 is softer and more elastically deformable than the base body portion 225, the lid body 220 at the closed position is suitably used as an arm rest. Since the lid body 220 is supported from the lower side by the closing stopper (not shown) as described above and thereby the position of the lid body 220 is regulated, further positional change of the lid body 220 in the closing direction is inhibited, and a load acting on the lid body 220 is received by the closing stopper. Thus, the lid body 220 at the closed position is suitably used as an arm rest.

As shown in FIG. 14, when each lid body 220 is at the closed position, the guide gear train 231 of each lid-side leg portion 230 meshes with the upper part of the guide rack 215. As shown in FIG. 13, the two link gear trains 250 constituting the link element 205 mesh with each other at the upper portions thereof. Hereinafter, according to need, one of the two lids 202 is referred to as a first lid $202^{1st}$, and the other lid 202 is referred to as a second lid $202^{2nd}$. The lid body 220 of the first lid $202^{1st}$ is referred to as a first lid body $220^{1st}$, and the lid body 220 of the second lid $202^{2nd}$ is referred to as a second lid body $220^{2nd}$. Of the two lids 202, one located on the right side in FIG. 12 is the first lid $202^{1st}$ and one located on the left side in FIG. 12 is the second lid $202^{2nd}$.

According to need, the lid-side leg portion 230 integrated with the front part of the first lid body $220^{1st}$ is referred to as a first lid-side leg portion $230^{1st}$, and the lid-side leg portion 230 integrated with the front part of the second lid body $220^{2nd}$ is referred to as a second lid-side leg portion $230^{2nd}$. Further, according to need, the link-side leg portion 235 pivotally supporting the first lid-side leg portion $230^{1st}$ is referred to as a first link-side leg portion $235^{1st}$, the link-side leg portion 235 pivotally supporting the second lid-side leg portion $230^{2nd}$ is referred to as a second link-side leg portion $235^{2nd}$, the pivotal shaft 237 provided in the first link-side leg portion $235^{1st}$ is referred to as a first pivotal shaft $237^{1st}$, the pivotal shaft 237 provided in the second link-side leg portion $235^{2nd}$ is referred to as a second pivotal shaft $237^{2nd}$, the urging element 206 mounted to the first pivotal shaft $237^{1st}$ of the first link-side leg portion $235^{1st}$ is referred to as a first urging element $206^{1st}$, and the urging element 206 mounted to the second pivotal shaft $237^{2nd}$ of the second link-side leg portion $235^{2nd}$ is referred to as a second urging element $206^{2nd}$.

In the closed state shown in FIG. 12, the first urging element $206^{1st}$ and the second urging element $206^{2nd}$ are compressed to store the urging force therein.

Therefore, in the closed state, a counterclockwise urging force in FIG. 12, which is caused by the first urging element $206^{1st}$, acts on the first link-side leg portion $235^{1st}$. Meanwhile, a clockwise urging force in FIG. 12, which is caused by the second urging element $206^{2nd}$, acts on the second link-side leg portion $235^{2nd}$.

As described above, at this time, the first lid body $220^{1st}$ and the second lid body $220^{2nd}$ are locked at the closed position by the locking element 207. Therefore, the first link-side leg portion $235^{1st}$ and the second link-side leg portion $235^{2nd}$ are also maintained at the closed position shown in FIG. 12, against the urging forces of the first urging element $206^{1st}$ and the second urging element $206^{2nd}$.

When the switch portion 270 of the locking element 207 is pressed downward, the engagement of the hook head portions 273 of the lock portion 271 with the lock receiving portions 276 of the lids 202 is canceled as described above.

Then, as shown in FIG. 13, the urging force of the first urging element $206^{1st}$ (not shown) causes the first link-side leg portion $235^{1st}$ to rotate counterclockwise in FIG. 13 around the first pivotal shaft $237^{1st}$. Further, the urging force of the second urging element $206^{2nd}$ (not shown) causes the second link-side leg portion $235^{2nd}$ to rotate clockwise in FIG. 13 around the second pivotal shaft $237^{2nd}$. Since the first link-side leg portion $235^{1st}$ and the second link-side leg portion $235^{2nd}$ are synchronized with each other by the two link gear trains 250 of the link element 205, the rotation speed of the first link-side leg portion $235^{1st}$ and the rotation speed of the second link-side leg portion $235^{2nd}$ at this time are substantially equal to each other.

At this time, the link-side pivotal support portion 236 of the first link-side leg portion $235^{1st}$ moves downward along an arc centered around the first pivotal shaft $237^{1st}$. Therefore, the lid-side pivotal support portion 232, of the first lid-side leg portion $230^{1st}$, in which the link-side pivotal support portion 236 is inserted also moves downward along the same arc. Likewise, the link-side pivotal support portion 236 of the second link-side leg portion $235^{2nd}$ moves downward along an arc centered around the second pivotal shaft $237^{2nd}$. Therefore, the lid-side pivotal support portion 232, of the second lid-side leg portion $230^{2nd}$, in which the link-side pivotal support portion 236 is inserted also moves downward along the same arc.

As shown in FIG. 14, each of the guide gear train 231 of the first lid-side leg portion $230^{1st}$ and the guide gear train 231 of the second lid-side leg portion $230^{2nd}$ meshes with the corresponding guide rack 215. Therefore, each of the first lid-side leg portion $230^{1st}$ and the second lid-side leg portion $230^{2nd}$ moves downward while being guided by the corresponding guide rack 215 and rotated. Therefore, at this time, as shown in FIG. 14, the first lid-side leg portion $230^{1st}$ and the first lid body $220^{1st}$ integrated with the first lid-side leg portion $230^{1st}$ biaxially rotate around the corresponding pivotal shaft 237 and lid-side pivotal support portion 232, while the second lid-side leg portion $230^{2nd}$ and the second lid body $220^{2nd}$ integrated with the second lid-side leg portion $230^{2nd}$ also biaxially rotate around the corresponding pivotal shaft 237 and lid-side pivotal support portion 232.

Specifically, the first lid-side leg portion $230^{1st}$ and the first lid body $220^{1st}$ rotate counterclockwise in FIG. 14 around the lid-side pivotal support portion 232 of the first lid-side leg portion $230^{1st}$. Since the lid-side pivotal support portion 232 rotates counterclockwise around the first pivotal shaft $237^{1st}$, the first lid body $220^{1st}$ is considered to biaxially rotate around the lid-side pivotal support portion 232 of the first lid-side leg portion $230^{1st}$ and around the first pivotal shaft $237^{1st}$.

Further, the second lid-side leg portion $230^{2nd}$ and the second lid body $220^{2nd}$ rotate clockwise in FIG. 14 around the lid-side pivotal support portion 232 of the second lid-side leg portion $230^{2nd}$. Since the lid-side pivotal support portion 232 of the second lid-side leg portion $230^{2nd}$ rotates clockwise around the second pivotal shaft $237^{2nd}$, the second lid body $220^{2nd}$ is considered to biaxially rotate around the lid-side pivotal support portion 232 of the second lid-side leg portion $230^{2nd}$ and around the second pivotal shaft $237^{2nd}$.

Since the first lid body $220^{1st}$ and the second lid body $220^{2nd}$ biaxially rotate as described above, movement loci of the first lid body $220^{1st}$ and the second lid body $220^{2nd}$ between the opened position and the closed position are reduced, whereby the box apparatus for vehicles is favorably mounted in a vehicle cabin that has a limited space.

The states of the first lid $202^{1st}$, the second lid $202^{2nd}$, and the link element 205 are changed up to the opened state shown in FIG. 16 through the semi-opened state shown in FIG. 15. The first lid body $220^{1st}$ and the second lid body $220^{2nd}$ biaxially rotate up to the opened position shown in FIG. 16 through the half-opened position shown in FIG. 15.

At the opened position shown in FIG. 16, each of the first lid body $220^{1st}$ and the second lid body $220^{2nd}$ has the opened-position upper-surface portion 222U facing upward and the closed-position upper-surface portion 221U facing sideward. At the opened position, the opened-position upper-surface portion 222U of each lid body 220 and its periphery protrude upward from the box 201.

At this time, the base body cover 225C of the first lid body $220^{1st}$ comes into contact with an upper surface of a right wall 245 of the box 201, and the base body cover 225C of the second lid body $220^{2nd}$ comes into contact with an upper surface of a left wall 246 of the box 201. Therefore, the upper surfaces of the right wall 245 and the left wall 246 of the box 201 function as opening stoppers 216, whereby rotation of the lids 202 stops.

More specifically, at this time, the opening stopper 216 supports the lid body 220 from the lower side to regulate the position of the lid body 220. Therefore, further positional change of the lid body 220 in the opening direction is inhibited, and a load acting on the lid body 220 is received by the opening stopper 216.

Further, the opened-position upper-surface portion 222U of the first lid body $220^{1st}$ and the opened-position upper-surface portion 222U of the second lid body $220^{2nd}$ are each formed of the cushion portion 228. Therefore, the first lid body $220^{1st}$ and the second lid body $220^{2nd}$ are also suitably used as arm rests at the opened position.

Since the opened-position upper-surface portion 222U is formed of the cushion portion 228, even if an occupant hits his/her arm or the like on the lid body 220, the impact is absorbed by the cushion portion 228. Therefore, in the box apparatus for vehicles according to the second embodiment, discomfort imparted to the occupant is reduced in the above case. That is, also in this regard, the box apparatus for vehicles according to the second embodiment is suitable as a box apparatus to be mounted in a limited space of a vehicle cabin.

As shown in FIG. 17, a width W1 of the opened-position upper-surface portion 222U of each lid body 220, i.e., the length of the opened-position upper-surface portion 222U in the vehicle width direction, is 20 mm which is sufficiently long. Therefore, the occupant is allowed to stably put his/her arm on the opened-position upper-surface portion 222U. The sloped surface 220SL continuous to the opened-position upper-surface portion 222U is also formed of the cushion portion 228 (refer to FIG. 16) and therefore is usable as an arm rest. A sum W2 of the width of the sloped surface 220SL and the width of the closed-position upper-surface portion 221U is 35 mm which is longer than the width W1 of the opened-position upper-surface portion 222U. Further, the sloped surface 220SL is chamfered and therefore is soft to the touch. Thus, excellent comfort during use is imparted to the box apparatus for vehicles according to the second embodiment.

In the box apparatus for vehicles according to the second embodiment, a difference W3 between the position, in the up-down direction, of the opened-position upper-surface portion 222U (indicated by a solid line in FIG. 17) at the opened position and the position, in the up-down direction, of the closed-position upper-surface portion 221U (indicated by a chain double-dashed line in FIG. 17) at the closed position is 10 mm which is very small. Therefore, regardless of whether the lid body 220 is at the opened position or the closed position, the occupant is allowed to use the lid body 220 as an arm rest without feeling discomfort. Also, in this regard, the box apparatus for vehicles according to the second embodiment is considered to be excellent in comfort during use.

Further, at the opened position, the base body covers 225C of the two lid bodies 220 come into contact with the upper surface of the right wall 245 and the upper surface of the left wall 246 of the box 201, i.e., the opening stoppers 216, from the upper side. Since the opening stopper 216 comes into contact with the base body cover 225C, of the lid 202, located far apart from the pivotal shaft 237, each lid body 220 is stably maintained at the opened position. Therefore, the arm of an occupant is stably supported by the lid body 220, thereby further improving the comfort during use of the lid body 220 as an arm rest.

When the lid body 220 at the opened position is rotated to the closed position to change the state of the box apparatus for vehicles from the opened state to the closed state, the occupant may manually rotate the lid body 220 from the opened position to the closed position against the urging force of the urging element 206. At this time, since the two lids 202 are synchronized with each other by the link element 205, the occupant only needs to rotate one of the lid bodies 220 from the opened position to the closed position.

The lock portion 271 of the locking element 207 is urged by the lock urging element so as to bring the hook head portions 273 close to the rear side, i.e., the lid 202. Therefore, at the lower side of each lid body 220 turned from the half-opened position to the closed position, the hook head portion 273 interferes with the lid body 220. However, as shown in FIG. 9, an upper rear part of the hook head portion 273 has a sloped surface from the upper and front side toward the lower and rear side. Therefore, the lid body 220 which comes into contact with the hook head portion 273 relatively slides on the sloped surface of the hook head portion 273, whereby the hook head portion 273 rotates frontward against the urging force of the lock urging element. Thus, the lid body 220 rotates toward the closed position without being stopped by the hook head portion 273 of the lock portion 271.

When the two lid bodies 220 rotate up to the closed position, the hook head portions 273 of the lock portion 271 are again engaged with the lock receiving portions 276 of the lid bodies 220. Thus, the lid bodies 220 are locked at the closed position, and the lids 202 are maintained in their closed state.

In the box apparatus for vehicles according to the second embodiment, each lid body 220 has a cutout shape with the sloped surface 220SL. Therefore, as shown in FIG. 10, the two lid bodies 220 in the closed states are visually apart from each other regardless of whether the lid bodies 220 are in contact or separated. Therefore, for example, even when the dimensional precision of the lids 202 is relatively low and the two lid bodies 220 are accidentally separated from each other at the closed position, the box apparatus for vehicles according to the second embodiment is hardly seen as being defective in design.

That is, since strict dimensional precision is not required for each lid body 220, in particular, a part near the sloped surface 220SL of the box apparatus for vehicles according to the second embodiment, the box apparatus for vehicles is advantageously manufactured at low cost.

As shown in FIG. 11, in the box apparatus for vehicles according to the second embodiment, each lid 202 is disposed on the side of the box 201, i.e., outside the box 201, at the opened position. Therefore, in the box apparatus for vehicles according to the second embodiment, the size of the lid 202 is increased and the internal space 211 is sufficiently increased, as compared with the case where the lid 202 is housed in the internal space 211 of the box 201 at the opened position. If the size of the lid 202, in particular, the lid body 220, is increased, the lid body 220 stably supports the arm of an occupant, thereby improving the comfort during use as an arm rest. Also, in this regard, the box apparatus for vehicles according to the second mode is considered to be excellent in comfort during use.

When the entirety of the lid body 220 is disposed lower than the upper surface of the box 201 at the opened position, a relatively large space for housing the lid body 220 is required on the side of the box 201. Meanwhile, when the opened-position upper-surface portion 222U of the lid body 220 and its periphery protrude upward from the box 201 at the opened position as in the box apparatus for vehicles according to the second embodiment, the space for housing the lid body 220 is reduced. In this case, the reduced space is assigned to the internal space 211, whereby the box apparatus for vehicles is allowed to have a relatively large internal space 211.

Third Embodiment

A box apparatus for vehicles according to a third embodiment is different from that of the second embodiment in the shape of each lid body and the shape of the outer peripheral wall of the box, and is substantially identical to that of the second embodiment in the other configuration.

FIG. 18 schematically shows the box apparatus for vehicles according to the third embodiment in which the lid bodies are at the closed position. FIG. 19 schematically shows the box apparatus for vehicles according to the third embodiment in which the lid bodies are at the opened position. FIG. 20 to FIG. 22 illustrate the operation of the box apparatus for vehicles according to the third embodiment.

Hereinafter, the box apparatus for vehicles according to the third embodiment is described mainly with respect to the configuration different from that of the box apparatus for vehicles according to the second embodiment.

The states of the first lid $202^{1st}$ and the second lid $202^{2nd}$ in the box apparatus for vehicles according to the third embodiment are changed between the opened states and the closed states like the first lid $202^{1st}$ and the second lid $202^{2nd}$ of the box apparatus for vehicles according to the second embodiment, and the first lid body $220^{1st}$ and the second lid body $220^{2nd}$ in the box apparatus for vehicles according to the third embodiment biaxially rotate between the opened position and the closed position.

As shown in FIG. 18, each lid body 220 in the box apparatus for vehicles according to the third embodiment has no sloped surface, and the closed-position upper-surface portion 221U and the opened-position upper-surface portion 222U are continuous at almost right angle. Therefore, the first lid body $220^{1st}$ and the second lid body $220^{2nd}$ seem to be continuous at the closed position. When the lid body 220 has the above-described shape, the width W1 of the opened-position upper-surface portion 222U of the lid body 220 at the opened position is increased as shown in FIG. 19, and the opened-position upper-surface portion 222U advantageously supports the arm of an occupant more stably. The width W1 of the opened-position upper-surface portion 222U is 35 mm in the box apparatus for vehicles according to the third embodiment.

The outer peripheral wall 242 of the box 201 in the box apparatus for vehicles according to the third embodiment has a shape corresponding to the shape of the closed-position lower-surface portion 221L of the lid body 220, i.e., the shape of the base body cover 225C.

As shown in FIG. 20, at the opened position, the first lid body $220^{1st}$ is disposed to the right side of the box 201, opposes the right wall 245, and comes into contact with a part of the right wall 245. Meanwhile, at the opened position, the second lid body $220^{2nd}$ is disposed to the left side of the box 201, opposes the left wall 246, and comes into contact with a part of the left wall 246.

Specifically, at the opened position shown in FIG. 20, the base body cover 225C of the first lid body $220^{1st}$ comes into contact, from the upper side, with an upper surface 245U of the right wall 245 of the box 201 and with an upper sloped surface 245SL which is continuous to the upper surface 245U and slopes from the upper left side to the lower right side. Further, at the opened position, the base body cover 225C of the first lid body $220^{1st}$ comes into contact, from the right side, i.e., the outside in the vehicle width direction, with a straight surface 245S which is continuous to the lower side of the upper sloped surface 245SL and extends in the up-down direction. Further, a bottom sloped surface 245B which gently slopes from the upper left side to the lower right side is provided on the lower side of the straight surface 245S of the box 201. A part, of the first lid body $220^{1st}$, disposed at the lower end at the opened position comes into contact with the bottom sloped surface 245B from the upper side at the opened position.

Therefore, at the opened position, the first lid body $220^{1st}$ interferes with the right wall 245 of the box 201, and is not positionally changed to the lower side and the left side. In other words, the right wall 245 of the box 201 inhibits further rotation of the first lid body $220^{1st}$ which has rotated from the closed position to the opened position.

Meanwhile, at the opened position, the base body cover 225C of the second lid body $220^{2nd}$ comes into contact, from the upper side, with an upper surface 246U of the left wall 246 of the box 201 and with an upper sloped surface 246SL which is continuous to the upper surface 246U and slopes from the upper right side to the lower left side. Further, at the opened position, the base body cover 225C of the second lid body $220^{2nd}$ comes into contact, from the left side, i.e., the outside in the vehicle width direction, with a straight surface 246S which is continuous to the lower side of the upper sloped surface 246SL and extends in the up-down direction. Further, a bottom sloped surface 246B which gently slopes from the upper right side to the lower left side is provided on the lower side of the straight surface 246S of the box 201. A part, of the second lid body $220^{2nd}$, disposed at the lower end at the opened position comes into contact with the bottom sloped surface 246B from the upper side at the opened position.

Therefore, at the opened position, the second lid body $220^{2nd}$ interferes with the left wall 246 of the box 201, and is not positionally changed to the lower side and the right side. In other words, the left wall 246 of the box 201 inhibits further rotation of the second lid body $220^{2nd}$ which has rotated from the closed position to the opened position.

Each of the upper surface 245U, the upper sloped surface 245SL, the straight surface 245S, and the bottom sloped surface 245B of the right wall 245 of the box 201 described above functions as an opening stopper 216 which comes into contact with the first lid body $220^{1st}$ at the opened position. Likewise, each of the upper surface 246U, the upper sloped surface 246SL, the straight surface 246S, and the bottom sloped surface 246B of the left wall 246 of the box 201 functions as an opening stopper 216 which comes into contact with the second lid body $220^{2nd}$ at the opened position.

Hereinafter, according to need, the opening stopper 216 is referred to as "opening stopper 208 for the lid body 220".

As shown in FIG. 18, the front wall 243 of the box 201 of the box apparatus for vehicles according to the third embodiment further includes two opening stoppers 216. At the opened position, one of the two opening stoppers 216 comes into contact with the first lid-side leg portion $230^{1st}$ and the second lid-side leg portion $230^{2nd}$. Hereinafter, according to need, this opening stopper 216 is referred to as "opening stopper 280 for the lid-side leg portion 230". At the opened position, the other one of the two opening stoppers 216 comes into contact with the first link-side leg portion $235^{1st}$ and the second link-side leg portion $235^{2nd}$. Hereinafter, according to need, the opening stopper 216 is referred to as "opening stopper 285 for the link-side leg portion 235".

As shown in FIG. 21, the opening stoppers 280 for the lid-side leg portions 230 each have a shape of a standing wall projecting frontward from the front wall 243. One of the opening stoppers 280 has: a bottom surface 281B which comes into contact with the lower surface of the first lid-side leg portion $230^{1st}$ in the opened state; and a side surface 281S which comes into contact with the right side surface of the first lid-side leg portion $230^{1st}$ in the opened state. In other words, when the box apparatus for vehicles is in the opened state, the first lid-side leg portion $230^{1st}$ comes into contact with the opening stopper 280 from the upper side and the left side. Therefore, when the box apparatus for vehicles is in the opened state, the first lid-side leg portion $230^{1st}$ interferes with the opening stopper 280 and is not positionally changed to the lower side and the right side. In other words, when the state of the box apparatus for vehicles has changed from the closed state to the opened state, the opening stopper 280 inhibits further rotation of the first lid-side leg portion $230^{1st}$.

The other one of the two opening stoppers 280 has: a bottom surface 282B which comes into contact with the lower surface of the second lid-side leg portion $230^{2nd}$ in the opened state; and a side surface 282S which comes into contact with the left side surface of the second lid-side leg portion $230^{2nd}$ in the opened state. In other words, when the box apparatus for vehicles is in the opened state, the second lid-side leg portion $230^{2nd}$ comes into contact with the opening stopper 280 from the upper side and the right side. Therefore, when the box apparatus for vehicles is in the opened state, the second lid-side leg portion $230^{2nd}$ interferes with the opening stopper 280 and is not positionally changed to the lower side and the left side. In other words, when the state of the box apparatus for vehicles has changed from the closed state to the opened state, the opening stopper 280 inhibits further rotation of the second lid-side leg portion $230^{2nd}$.

As shown in FIG. 22, the opening stoppers 285 for the link-side leg portions 235 each have a shape of a standing wall projecting frontward from the front wall 243, like the opening stoppers 280 for the lid-side leg portions 230. One of the opening stoppers 285 has: a bottom surface 286B which comes into contact with the lower surface of the first link-side leg portion $235^{1st}$; and a side surface 286S which comes into contact with the left side surface of the first link-side leg portion $235^{1st}$ in the opened state. In other words, when the box apparatus for vehicles is in the opened state, the first link-side leg portion $235^{1st}$ comes into contact with the opening stopper 285 from the upper side and the right side. Therefore, when the box apparatus for vehicles is in the opened state, the first link-side leg portion $235^{1st}$ interferes with the opening stopper 285 and is not positionally changed to the lower side and the left side. In other words, when the state of the box apparatus for vehicles has changed from the closed state to the opened state, the opening stopper 285 inhibits further rotation of the first link-side leg portion $235^{1st}$.

Likewise, the other one of the two opening stoppers 285 has: a bottom surface 287B which comes into contact with the lower surface of the second link-side leg portion $235^{2nd}$ in the opened state; and a side surface 287S which comes into contact with the right side surface of the second link-side leg portion $235^{2nd}$ in the opened state. In other words, when the box apparatus for vehicles is in the opened state, the second link-side leg portion $235^{2nd}$ comes into contact with the opening stopper 285 from the upper side and the left side. Therefore, when the box apparatus for vehicles is in the opened state, the second link-side leg portion $235^{2nd}$ interferes with the opening stopper 285, and is not positionally changed to the lower side and the right side. In other words, when the state of the box apparatus for vehicles has changed from the closed state to the opened state, the opening stopper 285 inhibits further rotation of the second link-side leg portion $235^{2nd}$.

As described above, when the box apparatus for vehicles according to the third embodiment is in the opened state, the position of each lid body 220 is regulated by the opening stopper 208 for the lid body 220, the position of each lid-side leg portion 230 is regulated by the opening stopper 280 for the lid-side leg portion 230, and the position of each link-side leg portion 235 is regulated by the opening stopper 285 for the link-side leg portion 235. Therefore, the position of each lid 202 of the box apparatus for vehicles according to the third embodiment is firmly regulated, and the corresponding lid body 220 is maintained at the opened position with extremely high stability. Thus, the lid body 220 of the box apparatus for vehicles according to the third embodiment supports the arm of an occupant more stably, thereby further improving the comfort during use of the lid body 220 as an arm rest.

At the opened position, the opening stopper 216 may come into contact with the lid body 220 or may come into contact with a leg portion such as the lid-side leg portion 230 or the link-side leg portion 235. In either case, the position of the lid body 220 at the opened position is regulated by the opening stopper 216, whereby excellent comfort during use as an arm rest is imparted to the box apparatus for vehicles.

Preferably, the opening stopper 216 regulates a further positional change, in the opening direction, of the lid body 220 at the opened position, and receives a load acting on the lid body 220 when the lid body 220 is used as an arm rest. Thus, stability of the lid body 220 when used as an arm rest and durability of the box apparatus for vehicles are improved.

In particular, the opening stopper 216 preferably comes into contact with the lid body 220 at the opened position. Since the lid body 220 is a part on which a load from an occupant acts when being used as an arm rest, if the lid body 220 is in direct contact with the opening stopper 216, the load acting on the lid body 220 is efficiently received by the opening stopper 216.

In the box apparatus for vehicles according to the third embodiment, the distance between the pivotal shaft 237 and the opening stopper 208 for the lid body 220, the distance between the pivotal shaft 237 and the opening stopper 280 for the lid-side leg portion 230, and the distance between the pivotal shaft 237 and the opening stopper 285 for the link-side leg portion 235 are each 20 mm or more.

Fourth Embodiment

A double-doored lid apparatus according to a fourth embodiment is substantially identical to the double-doored lid apparatus 101 according to the first embodiment except that the two lids 202 of the box apparatus for vehicles according to the second embodiment, i.e., the first lid $202^{1st}$ and the second lid $202^{2nd}$, are adopted instead of the right door 120 and the left door 130 of the double-doored lid apparatus 101 according to the first embodiment.

The double-doored lid apparatus according to the fourth embodiment provides the effects of the box apparatus for vehicles according to the second embodiment in addition to the effects of the double-doored lid apparatus according to the first embodiment.

While the embodiments of the present invention have been described above, the present invention is not limited to the embodiments described above, and can be implemented after being appropriately modified without departing from the gist of the invention. Furthermore, components shown in the embodiments may be extracted and freely combined to be implemented.

The invention claimed is:

1. A double-doored lid apparatus comprising:
a box body including a storage portion having an opening;
a first door configured to cover a part of the opening on one side so as to be openable and closable;
a second door configured to cover a part of the opening on the other side so as to be openable and closable;
an opening/closing mechanism configured to open and close the first door and the second door in conjunction with each other;
a locking mechanism configured to lock the first door and the second door in a closed state when the first door and the second door are closed up to a predetermined locking position;
a support member movable relative to the box body in an up-down direction; and
an urging member configured to generate an urging force that urges the first door and the second door in an opening direction via the support member when the first door and the second door are locked by the locking mechanism, the urging member having opposed end portions, one of the end portions being supported by the box body while the other end portion being supported by the support member, wherein
the support member includes
a first support portion that supports the other end portion of the urging member,
a second support portion that starts to come into contact with the first door before the first door reaches the predetermined locking position during a closing motion of the first door, and supports the first door when the first door is locked by the locking mechanism, and
a third support portion that starts to come into contact with the second door before the second door reaches the predetermined locking position during a closing motion of the second door, and supports the second door when the second door is locked by the locking mechanism.

2. The double-doored lid apparatus according to claim 1, wherein
the support member is a member formed in a T-shape having two wing portions that extend toward a side where the first door is present and a side where the second door is present, respectively,
the second support portion is provided on one of the wing portions, and
the third support portion is provided on the other wing portion.

3. The double-doored lid apparatus according to claim 2, wherein the first support portion is provided on a bottom portion of the support member.

4. The double-doored lid apparatus according to claim 1, wherein the urging member is disposed at one side, in a longitudinal direction, of the first door and the second door.

5. A double-doored lid apparatus comprising:
a box having an internal space with an opening facing upward; and
two lids each having a lid body and a pivotal shaft that is integrated with the lid body and is pivotally supported relative to the box, the two lids being configured to open and close the opening of the box,
wherein
the two lids are positionally changed between a closed position at which the lid bodies are disposed above the box and close the opening, and an opened position at which the lid bodies are disposed at opposing two sides of the box and open the opening,
each of the lid bodies includes an elastically deformable cushion portion and a base body portion harder than the cushion portion,
each of the lid bodies has an opened-position upper-surface portion that becomes an upper surface at the opened position and a closed-position upper-surface portion that becomes an upper surface at the closed position, and the opened-position upper-surface portion and the closed-position upper-surface portion are formed of the cushion portion, the two lids respectively have the lid body, a lid-side leg portion, and a link-side leg portion, each of the lid-side leg portions is integrated with each of the lid bodies, each of the link-side leg portions is pivotally supported by each of the lid-side leg portions and pivotally supported by the box, and of the link-side leg portions, a link-side pivotal support portion pivotally supported by each of the lid-side leg portions moves downward when the lid is positionally changed from the closed position to the opened position.

6. The double-doored lid apparatus according to claim 5, wherein a difference between a position, in an up-down direction, of the opened-position upper-surface portion at the opened position and a position, in the up-down direction, of the closed-position upper-surface portion at the closed position is within 30 mm.

7. The double-doored lid apparatus according to claim 5, wherein the opened-position upper-surface portion has a width not less than 20 mm.

8. The double-doored lid apparatus according to claim 5, wherein the double-doored lid apparatus is an arm rest.

9. The double-doored lid apparatus according to claim 5, wherein the box has an opening stopper that comes into contact with a part, of the lid, other than the pivotal shaft, at the opened position.

10. The double-doored lid apparatus according to claim 9, wherein the opening stopper has an opening stopper for the lid body provided on the upper surface of a peripheral wall of the box, and the opening stopper for the lid body comes into contact with the lid body at the opened position.

11. The double-doored lid apparatus according to claim 9, wherein the opening stopper has an opening stopper for the link-side leg portion provided on the side surface of the peripheral wall of the box, and the opening stopper for the link-side leg portion comes into contact with the link-side leg portion at the opened position.

12. The double-doored lid apparatus according to claim 5, wherein the peripheral wall of the box has a bottom sloped surface that is disposed at the lower side of the lid body at the opened position, and the bottom sloped surface slopes down forward.

13. The double-doored lid apparatus according to claim 5, wherein the lid body has a sloped surface between the opened-position upper-surface portion and the closed-position upper-surface portion.

14. A double-doored lid apparatus comprising:

a box having an internal space with an opening facing upward; and two lids each having a lid body and a pivotal shaft that is integrated with the lid body and is pivotally supported relative to the box, the two lids being configured to open and close the opening of the box, wherein the two lids are positionally changed between a closed position at which the lid bodies are disposed above the box and close the opening, and an opened position at which the lid bodies are disposed at opposing two sides of the box and open the opening, each of the lid bodies includes an elastically deformable cushion portion and a base body portion harder than the cushion portion, each of the lid bodies has an opened-position upper-surface portion that becomes an upper surface at the opened position and a closed-position upper-surface portion that becomes an upper surface at the closed position, and the opened-position upper-surface portion and the closed-position upper-surface portion are formed of the cushion portion, the two lids respectively have the lid body, a lid-side leg portion, and a link-side leg portion, each of the lid-side leg portions is integrated with each of the lid bodies, each of the link-side leg portions is pivotally supported by each of the lid-side leg portions and the box, and has an end portion opposed the lower surface of the lid body at the closed position, and the end portion supports the lid body from the lower side when the lid positionally changes to the lower side.

* * * * *